United States Patent [19]

Brands

[11] Patent Number: 5,606,617
[45] Date of Patent: Feb. 25, 1997

[54] SECRET-KEY CERTIFICATES

[76] Inventor: Stefanus A. Brands, Ina Boudier-Bakkerlaan 143 (iii), XW Utrecht, Netherlands, 3582

[21] Appl. No.: 321,855

[22] Filed: Oct. 14, 1994

[51] Int. Cl.$^6$ ................................ H04L 9/30
[52] U.S. Cl. ............................................. 380/30
[58] Field of Search .................................. 380/30

[56] References Cited

U.S. PATENT DOCUMENTS

| | | | |
|---|---|---|---|
| 4,759,063 | 7/1988 | Chaum | 380/30 |
| 4,868,877 | 9/1989 | Fischer | 380/30 |
| 4,947,430 | 8/1990 | Chaum | 380/30 |
| 5,005,200 | 4/1991 | Fischer | 380/30 |
| 5,373,561 | 12/1994 | Haber et al. | 380/30 |
| 5,475,753 | 12/1995 | Barbará et al. | 380/30 |

OTHER PUBLICATIONS

Fiat, A. and Shamir, A., "How to prove yourself: practical solutions to identification and signature problems," Crypto '86, Springer–Verlag (1987), pp. 186–194.

Schnorr, C., "Efficient Signature Generation by Smart Cards," Journal of Cryptology, vol. 4, No. 3 (1991), pp. 161–174.

ElGamal, T., "A public key cryptosystem and a signature scheme based on discrete logarithms," IEEE Transactions on Information Theory, vol. IT-31, No. 4, Jul. 1985, pp. 469–472.

Okamoto, T., "Provably Secure and Practical Identification Schemes and Corresponding Signature Schemes," Crypto '92, Lecture Notes in Computer Science 740, Springer–Verlag (1993), pp. 31–53.

Brickell, E. and McCurley, K., "An interactive identification scheme based on discrete logarithms and factoring," Journal of Cryptology, vol. 5, No. 1 (1992), pp. 29–39.

NIST, "Specifications for a digital signature standard (DSS)," Federal Information Processing Standards Pub. (draft), May 19, 1994.

R. Rivest, A. Shamir and L. Adleman, "A method for obtaining digital signatures and public–key cryptosystems," Communications of the ACM, Feb. 1978, pp. 120–126.

Guillou, L. and Quisquater, J., "A practical zero–knowledge protocol fitted to security microprocessor minimizing both transmission and memory," Lecture Notes in Computer Science 330, Proceedings of Eurocrypt '88, Springer–Verlag (1989), pp. 123–128.

Feige, U., Fiat, A. and Shamir, A., "Zero–knowledge proofs of identity," Journal of Cryptology 1 (1988), pp. 77–94.

*Primary Examiner*—Salvatore Cangialosi
*Attorney, Agent, or Firm*—Pennie & Edmonds

[57] ABSTRACT

Cryptographic methods and apparatus are disclosed that enable forming and issuing of secret-key certificates. Contrary to the well-known cryptographic technique of public-key certificates, where a public-key certificate is a digital signature of a certification authority on a public key, pairs consisting of a public key and a corresponding secret-key certificate can be generated by anyone. As a result, a public-key directory based on secret-key certificates cannot help anyone in attacking the signature scheme of the certification authority, and it does not reveal which of the listed public keys have been certified by the certification authority and which have not.

Yet, if a party associated with a public key can perform cryptographic actions with the secret key corresponding to its public key, such as decrypting, digital signing, issuing a secret-key certificate, and identification, then the certificate must have been computed by the certification authority.

21 Claims, 12 Drawing Sheets

$\mathcal{U}$            CA

31

$x \in_{\mathcal{R}} \mathbb{Z}_q$
$h \leftarrow g^x$
Send: $h$

32

$w \in_{\mathcal{R}} \mathbb{Z}_q$
$a \leftarrow g^w$
$c \leftarrow \mathcal{H}(h, a, I)$
$r_0 \leftarrow cx_0 + w \bmod q$
Send: $(c, r_0)$

33

$c \stackrel{?}{=} \mathcal{H}(h, g^{r_0} h_0^{-c}, I)$
$r \leftarrow r_0 + cx \bmod q$

FIGURE 3

SECRET-KEY CERTIFICATES

BACKGROUND OF THE INVENTION

1. Field of the Invention

The present invention relates to cryptographic techniques, and more particularly to methods and apparatus for implementing certificate schemes based on public-key cryptography.

2. Description of the Prior Art

Public-key certificates, usually plainly referred to as certificates, are an essential cryptographic tool for secure key management. The idea is to have a specially appointed party, commonly called the Certification Authority, certify the public keys of other parties in the system by digitally signing these public keys with its own secret key. By widely distributing the public key of the Certification Authority through a variety of media, one can be assured that it is genuine. Because a public-key certificate is a digital signature of the Certification Authority on a public key, certificates on public keys of other parties can be verified by anyone by using the public key of the Certification Authority. The net effect is that impersonation attacks, and similar other attacks, are prevented.

In practical applications, the certificate of the Certification Authority may, and perhaps should, certify additional information. Along with the public key, a certificate could validate such information as the name of the party associated with the public key, employer, telephone number, electronic mail address, and a list of access rights.

To facilitate practicality of the certificate issuing process, public keys can be recursively certified according to a hierarchical structure. For example, in an electronic cash system, the main bank can certify the public keys of all the local banks, the local banks in turn can certify public keys in POS terminals by using their certified keys, and the secret keys corresponding to the public keys in the POS terminals can be used to decrypt information that is sent by the host. The hierarchic certification process can be thought of as building a tree, each node containing a public key and a certificate on the public key. A certificate on a public key in a node is a digital signature on that public key, that has been computed by the party associated with the parent node by applying the secret key that corresponds to the public key of the parent node. Anyone can verify the validity of a public key be recursively descending (or ascending) the tree from the root node to the node associated with the public key that is being verified (or vice versa). A certification hierarchy that is often suggested is one that is implied by the life-time of the cryptographic keys: keys that are more susceptible to attacks are changed more frequently, and are certified by keys that have a longer life-time.

Public keys can be listed in so-called public-key directories, which can be made available on CD-ROM or other media. In order to encrypt a message intended for another party, one needs to merely look up the public key of that other party in the public-key directory, verify the validity of the certificate, and encrypt the message with the public key. It can then be sent to the other party. No interaction is needed between the two parties. In this way for instance encrypted electronic mail can be sent over a computer network.

Because the certificate mechanism obviates the need for the public-key directory to be secured, public keys need not necessarily be listed in a public-key directory. They may be sent (along with the certificate) on request, by the party associated with the public key itself, or by any other party that need not be trusted, such as a server in a computer network.

In cryptographic mechanisms for transfer of credentials, the Certification Authority at issuing time can issue a certificate on a public key of a user; the type of credential that is issued can, for instance, be denoted by the type of signature that the Certification Authority computes. This allows the user, when transferring the credential to a recipient, to make a digital signature on a message of the recipient (describing such information as the identity of the recipient and transaction details), by using the secret key corresponding to his certified public key. The certificate proves the validity of the credential to the recipient, whereas the signature made by the user proves that the user willingly transferred the credential to the recipient.

For privacy-protected transfer of credentials, the information that is issued by the Certification Authority should not be linkable to executions of the issuing protocol. Special techniques are known that enable the user to blind the issuing protocol while interacting with the Certificate Authority.

While important and useful, the public-key certificate technique also has a few problems associated with it. First of these relates to privacy. It is conceivable that providers for a variety of electronic systems available in the new future will require participants to meet certain criteria before certifying their public keys. These criteria may include social status, income, type of job, trustworthiness, and so on. Because a public-key certificate is a digital signature of the Certification Authority on the public key, pairs consisting of a public key and a corresponding public-key certificate reveal to anyone which parties are participating in a certain system, and which parties are not participating. This reveals which parties meet the criteria specified by the Certification Authority, and which parties may not meet them. Likewise, the genuineness of the additional information (employer, telephone number, access rights, and so on) that may have been certified along with the public key, is revealed. Consequently, public-key certificates allow anyone to extract profiles of other parties, by scanning for their appearances, or the lack thereof, in compiled lists of certified public keys (such as public-key directories). This problem is by no means removed by letting participants send their public keys only on request, instead of using a public-key directory.

A second problem is that the publication of a public-key directory reveals a huge amount of digital signatures of the Certification Authority on known, or chosen, public keys. Although most of the known digital signature schemes are believed to be secure under known, or (adaptively) chosen, message attacks, only a few signature schemes are known that can be proven to be secure, assuming the existence of functions that are substantially unfeasible to invert. Unfortunately, these schemes are currently not practical for large-scale use. Since public-key directories typically will contain an enormous amount of entries, the Certification Authority will have to use an efficient signature scheme. This implies that the signatures in the public-key directory may be helpful in attempts to break the signature scheme of the Certification Authority; they can be used to mount known or (adaptively) chosen message attacks. Again, this problem is not removed by letting participants send their public keys only on request, instead of using a public-key directory.

A third problem is in blinding public-key certificate issuing protocols in mechanism for privacy-protected transfer of credentials (see, for instance, U.S. Pat. No. 4,759,063 to Chaum for a discussion of the technique of blinding in public-key cryptography). In many circumstances, the Certification Authority does not want the users to be able to blind to their hearts' contents, but would like to encode information in the issued information that cannot be changed by the blinding operations of the user. For instance, the mechanisms for transferring credentials under pseudonym, this encoded information can be uniquely associated with the user that the credential is issued to, thereby linking the pre-images of all the pseudonyms of each user. In this way, it can be ensured that users cannot use the credentials of other users, even if they cooperate. For credentials that may be shown only a limited number of times, such as coins in an electronic can system, it can be arranged that this encoded information is revealed if and only if the credential is shown a number of times exceeding a predetermined limit. This obviates the need for on-line verification of these credentials. For such purposes, an issuing protocol is needed in which the Certification Authority issues a secret key, a public key, and a public-key certificate, in such a way that the public key and the certificate can be perfectly blinded by the user, by a non-constant function of the secret key cannot. Such an issuing protocol is called a restrictive blind signature issuing protocol, and is described and claimed in patent application Ser. No. 08/203,231, filed Feb. 28, 1994, and is incorporated by reference herein. From the point of view of security, no satisfactory constructions of restrictive blind signature issuing protocols are known in which the certificate is a public-key certificate. This is a serious problem, since restrictive blind signature issuing protocols are of crucial importance for the construction of efficient and secure mechanisms for privacy-protected off-line transfer of credentials.

Patent application Ser. No. 08/203,231, filed Feb. 28, 1994, also describes and claims an inventive method for constructing restrictive blind signature issuing protocols where the issued certificate is not a digital signature on the public key (and hence not a public-key certificate). As is demonstrated in detail, the construction of efficient and secure restrictive blind signature issuing protocols becomes much easier by removing the need for the certificate to be a signature of the issuer on the public key. Most (more specifically, all but the last one described) of the exemplary restrictive blind signature issuing protocols described and claimed in patent application Ser. No. 08/203,231 are constructed by applying this inventive method.

While the inventive method described and claimed in patent application Ser. No. 08/203,231 overcomes the third problem associated with public-key certificates, it does not address the first two problems. This invention describes a generalized method that also overcomes the first two problems associated with public-key certificates.

OBJECTS OF THE INVENTION

Accordingly, it is an object of the present invention to allow anyone to generate pairs consisting of a public key and a corresponding certificate, while at the same time ensuring that it is unfeasible to generate, without knowledge of a special secret key that is held by a Certification Authority, triples consisting of a secret key, a matching public key, and a corresponding certificate, by providing for a new kind of certificates that will henceforth be called secret-key certificates.

Another object of the present invention is to prevent lists of certified public keys, such as public-key directories, from revealing the genuineness of privacy-related information, by using secret-key certificates instead of public-key certificates.

A further object of the present invention is to prevent lists of certified public keys, such as public-key directories, from revealing information that may be helpful in known or chosen message attacks on the signature scheme of the Certification Authority, by using secret-key certificates instead of public-key certificates.

Yet another object of the present invention is to describe techniques to construct secret-key certificates, and issuing protocols therefor, from a class of well-known digital signature schemes, (see, Fiat, A. and Shamir, A., *"How to prove yourself: practical solutions to identification and signature problems,"* Crypto '86, Springer-Verlay (1987), pp. 186–194).

A still further object of the present invention is to construct efficient and secure restrictive blind secret-key certificate issuing protocols, by letting the Certification Authority issue triples consisting of a secret key, a matching public key, and a corresponding secret-key certificate, such that the public key and the certificate can be perfectly blinded by the receiving party, but at least part of the secret key cannot be blinded.

An even further object of the present invention is to implement hierarchical certification by recursively using secret-key certificates instead of public-key certificates.

Still another object of the present invention is to allow efficient, economical, and practical apparatus and methods fulfilling the other objects of the invention.

Other features, objects, and advantages of this invention will be appreciated when the description and appended claims are read in conjunction with the figures.

BRIEF DESCRIPTION OF THE DRAWINGS

FIG. 3 shows a flow chart of a secret-key certificate issuing protocol, such that the Certification Authority does not need to know the secret key of the recipient, for the first preferred embodiment in accordance with the teachings of the present invention.

SUMMARY OF THE INVENTION

Figure 1:
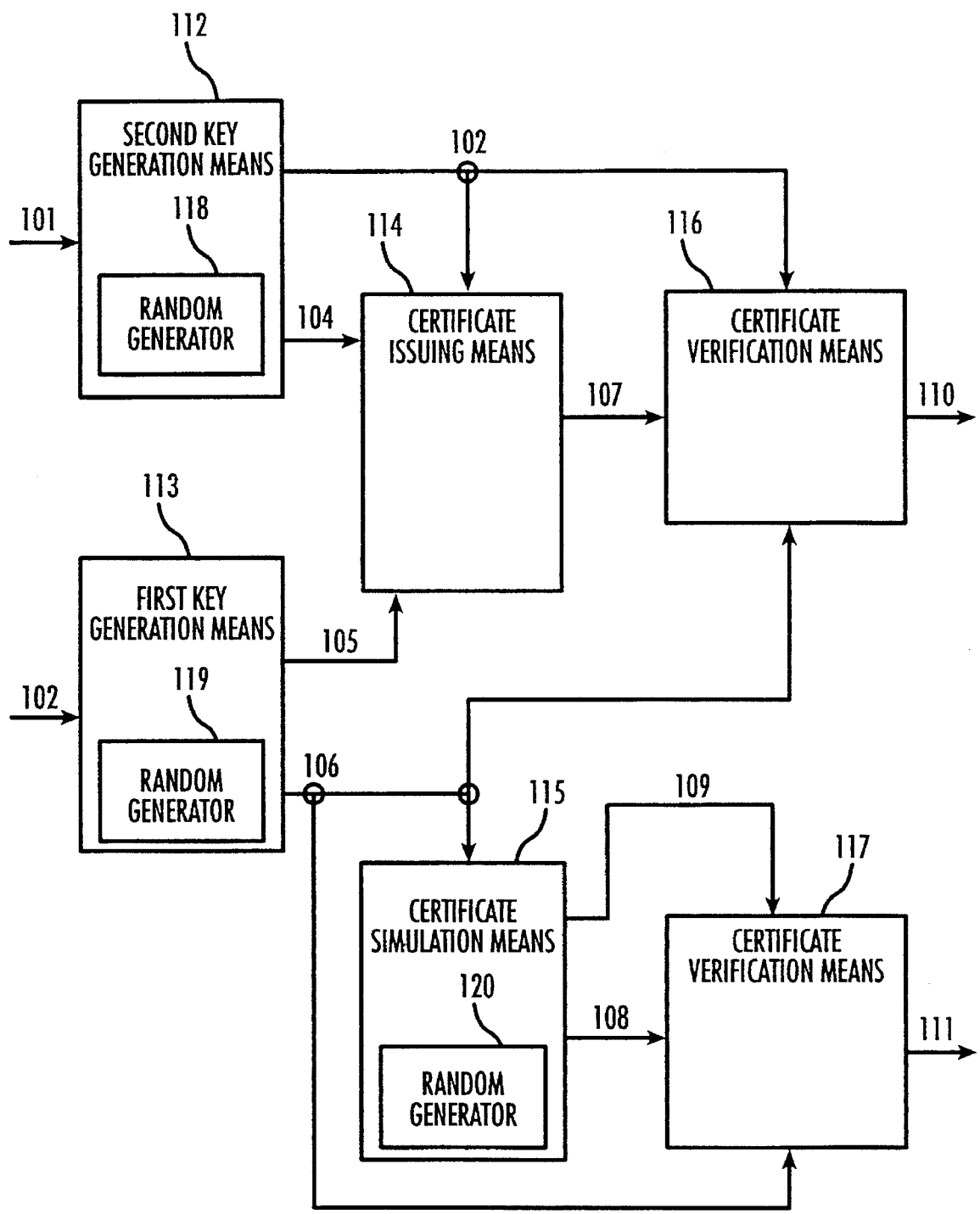
FIG. 1 shows a representative combination block and functional diagram of an exemplary secret-key certificate system in accordance with the teachings of the present invention.

In accordance with these and other objects of this invention, a brief summary of the invention is presented. Some simplifications and omissions may be made in the following summary, which is intended to highlight and introduce some aspects of the present invention, but not to limit its scope. Detailed descriptions of preferred exemplary embodiments adequate to allow those of ordinary skill in the art to make and use this invention will be provided later.

In essence, the primary purpose of a public-key certificate is to certify the tasks that a participant in a cryptographic system can successfully perform with respect to his public key, rather than the public key itself. Consider the three most well-known public-key cryptographic tasks in a cryptographic system: digital signing, identification, and encryption. The intended purpose of a certificate is to certify that the tasks of digital signing, proving knowledge of a secret key that corresponds to a public key, and decrypting a message that is encrypted with a public key, are performed using a secret key the usage of which has been permitted by the Certification Authority. In other words, it is the secret key that must be certified, not necessarily the public key.

Informally, a secret-key certificate is a digital signature of the Certification Authority on a secret key, such that it is not a digital signature on the public key that matches the secret key. More precisely, triples consisting of a secret key, a matching public key, and a corresponding secret-key certificate can be feasibly generated only by the Certification Authority, but pairs consisting of a public key and a corresponding secret-key certificate can be feasibly generated by anyone.

The following illustration may help to appreciate how such a condition can be met. Consider the task of generating a pair (s, h≠1), such that h is equal to $g^s$, where g is a randomly chosen generator of a group in which multiplication is simple but no feasible algorithms for computing discrete logarithms are known. As will be obvious to those of ordinary skill in the art, this is a simple task; unless, in addition, one must also know a number t such that h is equal to $g_1^t$, where $g_1$ is another randomly chosen generator of the group, that has been fixed in advance.

In a public-key directory, parties are listed together with their public keys and corresponding certificates. If the certificates are secret-key certificates, then the information in the directory does not reveal discriminating information about legitimate participation, as each of the entries could have been generated by anyone (if the directory is, or has been at a certain point in time, open for public writing). If additional information is included as well, such as telephone numbers, postal address, and access rights, than this may be bogus information as well. To ensure that users will be unable to tell whether entries in a public-key directory have been certified by the Certification Authority or not, the manufacturer of a public-key directory on, say, a CD-ROM, can gather the entries in the Directory by letting the parties associated with the public keys submit their own public keys and associated secret-key certificates, as they wish them to appear on the CD-ROM.

For the same reason, the information listed in the directory cannot be of much help in attaching the signature scheme of the Certification Authority. In particular, it can be of no help whatsoever if pairs consisting of a public key and a corresponding secret-key certificate can be generated, without cooperation of the Certification Authority, with a probability distribution that is indistinguishable from the probability distribution that applies when the certificate issuing protocol is performed with the Certification Authority.

An attacker whose keys have not been certified by the KAC would need to known the secret keys of legitimate participants in the system in order to have any advantage in breaking the signature scheme of the Certification Authority over trying to break it from scratch. Revealing one's secret key brings along a great deal of trust in that it will not be misused, and so in practice the consequence of using secret-key certificates instead of public-key certificates is that known or chosen message attacks to break the signature scheme of the KAC will be much harder to mount.

Secure public-key cryptographic schemes, such as schemes for the aforementioned tasks of proving knowledge of a secret key corresponding to a public key, signing a message with a secret key corresponding to a public key, and decrypting a message encrypted with a public key, are only feasible to perform if one actually knows the secret key corresponding to the public key. Hence, the fact that a user can successfully perform such a task attests to the fact that he knows the secret key corresponding to his public key, and this in turn proves that the certificate must have been issued by the Certification Authority.

The following illustrations are helpful to appreciate the use of secret-key certificates:

1. Suppose that a first party wants to transfer an encrypted message to a second party. From the public-key directory, the first party retrieves the public key of the second party, and a corresponding secret-key certificate, which supposedly has been issued by the Certification Authority. The first party encrypts its message using the public key of the second party, and transfers it to the second part. Although the first party does not know whether the information listed in the public-key directory is genuine or not, it is ensured that if the second party can decrypt and retrieve the original message, then the Certification Authority computed the string listed in the public-key directory. Obviously, a proper response of the second party to the first party will allow the first party to distinguish between the two cases.

2. Suppose that the second party digitally signs a message for the first party. Given the message, the digital signature of the second party, and the information listed with the second party in the public-key directory, the first party is able to verify not only that the digital signature is genuine, but it is also ensured that it was indeed made with a certified key. Of course, if this signature is to have any legal significance, then anyone should be able to verify these two facts.

3. Suppose that the second party wishes to obtain a secret-key certificate, issued by the first part. To this end, the first party issues, by applying its secret key, a secret-key certificate on a public key of the second party. Not only can the second party verify the validity of the secret-key certificate issued by the first party, by using the public key of the first party, but if the verification holds, it also is ensured that the secret-key certificate on the public key of the first party has been issued by the Certification Authority. In general, recursive application of secret-key certificates allows hierarchical certification trees to be formed that offer the same security as hierarchical certification trees formed from public-key certificates.

An example of a secret-key certificate and a corresponding issuing protocol will now be described. As is common in the art, for any integer, l, the symbol $\mathbb{Z}$ denotes the set of integers $\{0, \ldots, 1-1\}$, for which addition and multiplication are defined modulo l. Let $G_q$ denote a group of prime order, q, for which no feasible algorithms are known to compute discrete logarithms, and let $\mathcal{H}$ be a one-way hash-function that maps its arguments to $\mathbb{Z}_2{}^t$, where t is an appropriately large security parameter. The secret key of the Certification Authority is a number $x_0$ in $\mathbb{Z}_q$, and the corresponding public key is $(g, h_0)$, where $h_0$ denotes $g^{x_0}$, and both g and $h_0$ are in $G_q$. The parties, whose keys are to be certified, use the same key set-up as the Certification Authority: the secret key of a party $\mathcal{U}$ is a number x in $\mathbb{Z}_q$, and the corresponding public key is $h=g^x$. a secret-key certificate on h is a pair (c, r), where c is in $\mathbb{Z}_{2t}$ and r is in $G_q$, such that c is equal to $\mathcal{H}(h, g^r(h_0 h)^{-c}, I)$. Here, I is an, optionally included, string consisting of additional information about the party associated with the public key.

As will be clear to those of ordinary skill in the art, the certificate of the Certification Authority in effect is a Schnorr signature (see; Schnorr, C., *"Efficient Signature Generation by Smart Cards,"* Journal of Cryptology, Vol. 4, No. 3, (1991), pp. 161–174) on $g^x$, made with secret key $x_0+x$ mod q. Anyone can feasibly generate pairs h,(c,r) such that the verification relation holds, by taking h equal to $h_0^{-1}g^s$ for an arbitrary s in $\mathbb{Z}_q$, and a equal to $g^t$ for an arbitrary t in $\mathbb{Z}_q$; the pair (c,sc +t mod q), with $c=\mathcal{H}(h,a,I)$, then matches h. However, the ability to feasibly generate such pairs together with the secret key $\log_g h$ would enable one to forge Schnorr signatures.

To issue a secret-key certificate, the Certification Authority can proceed as follows. It generates at random a number w in $\mathbb{Z}_q$, and computes $a=g^w$. It then computes $c=\mathcal{H}(h,a,I)$ and $r=c(X_0+x)+w$ mod q, and transfers (c,r) to $\mathcal{U}$. As will be demonstrated in the detailed description, the issuing protocol can be modified such that the need for the Certification Authority to known the secret key $\mathcal{U}$ can be prevented. Moreover, a variety of blinding capabilities for $\mathcal{U}$ can be incorporated into the issuing protocol.

In sum, the present invention describes certificate techniques based on public-key cryptography, that solve problems related to the well-known cryptographic technique of public-key certificates.

DETAILED DESCRIPTION OF THE INVENTION

While it is believed that the notation of FIGS. 2 to 12 would be clear to those of ordinary skill in the art, it is first reviewed here for definiteness.

A variety of secret-key certificates issuing protocols is described by flowcharts. The actions performed by the parties participating in these protocols are grouped together into flowchart boxes. The party performing the actions described in a flowchart box is indicated by the column that the box is in. The columns are labeled by a symbol denoting the type of party. The term"party" is used to indicate an entity with control over at least the secrecy of some information, usually at least one key. It is anticipated that a plurality of people may each known all or part of some key, and that they might collectively be thought of as a party. In other cases, a key may be substantially unknown to people, and reside in some physical device, and the device itself or those who control it from time to time, may be regarded as parties. Thus the parties denoted by single boxes or collections of boxes might sometimes be regarded as agents who perform a step or a collection of steps in a protocol. They might also be regarded as means for performing those steps, and might be comprised of any suitable configuration of digital logic circuitry. For example, any box or collection of boxes from the figures could be realized by hard-wired and dedicated combinatorial logic, or by some sort of suitably programmed machine, a microprocessor for instance, such as are well-known in the art, just as long as it is able to perform the storage, input/output and transformational steps (possibly apart from the random source functions) described by the corresponding box or boxes.

As is common in the art, for any integer, l, the symbol $\mathbb{Z}_l$ denotes the set of numbers $\{0, \ldots, 1-1\}$. Addition and multiplication of elements in $\mathbb{Z}_l$ are defined module l. Similarly, the symbol $\mathbb{Z}_i^*$ denotes the set of number in $\{0, \ldots 1-1\}$ that are co-prime to l. Multiplication of elements in $\mathbb{Z}_i^*$ is defined modulo l. As is well-known in the art, $\mathbb{Z}_l$ is called a ring of integers modulo l, and $\mathbb{Z}_i^*$ is called a multiplicative group of integers modulo l.

The symbol "←" denotes assignment, meaning that the variable or symbol on its left-hand side is assigned the value on its right-hand side to. The assignments do not necessarily imply that storage space must actually be reserved; they may indicate intermediate values manipulated in volatile memory.

Another operation is a test for equality, which is indicated by the = symbol. As is common in the art, the protocol halts in the case the equality does not hold.

The symbol $\in_R$ indicates that the number, or each of the numbers, on its left-hand side is chosen from the set on its right-hand side according to a uniform probability distribution, and independent of anything else. In practice, pseudorandom techniques may be used, and the deviation from the uniform distribution may be significant without resulting in an appreciable loss in security and/or privacy. Such techniques are well-known in the art.

Another action is denoted by the word "Send," followed by a colon and one or more numbers. This indicates that these numbers are sent by the party performing the actions described in the box to the other party participating in the protocol. The directed connections between the boxes indicate the order in which the actions that are grouped in the boxes are performed.

Apparatus for Secret-Key Certificates Systems

A precise description of the apparatus for a secure secret-key certificate system will now be given. The apparatus comprises the following five means:

1. First key generation means that, on being given as input at least a security parameter, outputs a secret key and a matching public key, to be used by the Certification Authority for certifying keys of parties that wish to participate in the cryptographic system.

As will be clear to those of ordinary skill in the art, the binary length of the output is polynominally (preferably linearly) related to the security parameter.

The first key generation means is of a probabilistic nature, meaning that the key pair is generated in a substantially random manner. Preferably, the randomization process is based on the output of some physical source of randomness, possibly combined with the output of a cryptographically strong pseudo-random number generator taking, for instance, the bitwise exclusive-or of the two outputs.

2. Second key generation means that, on being given as input at least a security parameter, outputs a key pair consisting of a secret key and a matching public key, to be used by a party that wishes to participate in the cryptographic system.

As with the first key generation means, the output is the result of a suitable randomization process. The means may be operated by the party itself, by the Certification Authority, or by the both of them. The first and second key generation means may, but need not, be equivalent.

3. Certificate verification means that, on being given as input the public key of the Certification Authority and a pair consisting of a public key and a presumed secret-key certificate, outputs a response that is to be interpreted as "yes" or "no."

Usually, the verification relation will be deterministic, but this need not be the case; the certificate verification means may be of probabilistic nature, performing a great many random trials in order to decide whether the presumed certificate is a secret-key certificate on the public key.

The certificate verification means outputs "yes" if and only if the presumed certificate is a secret-key certificate on the public key. In other words, the certificate verification means defines what a secret-key certificate on a public key is.

4. Certificate issuing means that, on being given as input the secret key of the Certification Authority and a pair consisting of a secret key and a matching public key of a party that requires a certificate, outputs a digital signature on the secret key, such that the certificate verification means, on being given as input the public key of the Certification Authority and a pair consisting of the public key and the issued digital signature, outputs "yes" (and so the output of the certificate issuing means is a secret-key certificate on the public key).

The certificate issuing means may, but need not, be of a probabilistic nature.

Obviously, it will usually suffice to take only the secret key of the Certification Authority and the secret key of the party as input, since the public key can usually be computed from the secret key.

As will be appreciated, the certificate issuing means can be such that the party, whose keys are to be certified, can keep secret from the Certification Authority its secret key. In that case, the certificate issuing means itself comprises means controlled by the party, means controlled by the Certification Authority, and suitable interface means for allowing communication therebetween. The means controlled by the party takes as input the secret key of the party (and possibly also the public key of the party), and the means controlled by the Certification Authority takes as input the secret key of the Certification Authority (and possibly also the public key of the party). The final output is the result of processing by the means controlled by the party and the means controlled by the Certification Authority, where appropriate intermediate results may be communicated through the interface means. The precise actions to be performed by the means that the certificate issuing means comprises, must be described by a cryptographic protocol, henceforth called a secret-key certificate issuing protocol.

Yet another variation is that the Certification Authority can compute the secret keys corresponding to any public key of a party that requires a secret-key certificate, because it knows additional trap-door information.

These and other variations will be appreciated by studying the exemplary embodiments. For example, the certificate issuing process may be blinded by the means controlled by the party, according to a variety of criteria that will be described in the text.

5. Certificate simulating means that, on being given as input the public key of the Certification Authority, outputs a pair consisting of a public key and a matching certificate.

The public key that is output is such that it could have been output by the second key generation means (as part of the pair that it outputs). "Matching" indicates that the certificate verification means, on being given as input the public key of the Certification Authority and the output of the certificate simulating means, outputs "yes." The certificate simulating means is of a probabilistic nature, and the probability distribution of its output should be substantially indistinguishable from the probability distribution that applies when the public key is generated by the second key generation means and the certificate is generated by the certificate issuing means.

As will be clear to those of ordinary skill in the art, "substantially" indistinguishable may mean "computationally," "statistically," or "perfectly" indistinguishable, each of which has a precise mathematical meaning that is well-known in the art. Obviously the indistinguishability property need not be this strong for practical purposes. For instance, if the set of possible outputs produced by the certificate simulating means on being given a certain input is sufficiently large, in practice nobody will be able to distinguish between simulated pairs and "genuine" pairs consisting of a public key and a matching secret-key certificate.

In applications in which parties wish to generate pairs consisting of a public key and a corresponding secret-key certificate, without cooperation of the Certification Authority, the certificate simulating means must obviously be constructed. However, as will be clear to those of ordinary skill in the art, the certificate simulating means need not always be constructed. Applications are conceivable in which it is sufficient to know that the certificate simulating means can be constructed, without the means actually needing to be build.

Each of the described five means can be realized by hard-wired and dedicated combinatorial logic, or by some sort of suitably programmed machine, a microprocessor for instance, such as are well-known in the art.

Because a secret-key certificate on a public key, as issued by the certificate issuing means, is in effect a digital signature on the secret keys corresponding to the public key, it is unfeasible for parties other than the Certification Authority to generate, without involvement of the Certification Authority, new triples consisting of a secret key, a matching public key (meaning that the pair could have been generated by the second key generation means), and a corresponding secret-key certificate (meaning that the certificate verification means would output "yes" when being given as input the public key of the Certification Authority, and the public key and the certificate).

It is stressed that the secret-key certificate is said to be a secret-key certificate on the public key, not on the secret key: both the certificate issuing means and the certificate simulating means can output pairs consisting of a public key and a secret-key certificate on the public key. This emphasizes that there is a publicly verifiable relation between the public key and the secret-key certificate.

Turning now to FIG. 1, an exemplary description of the interconnection and cooperation of the constituent parts described above will not be presented. All the lines in FIG. 1 imply the transfer of messages. These may be held initially or delayed on their way, encoded and decoded cryptographically or otherwise to provide their authenticity and/or secrecy and/or error detection and/or error recovery. Thus the particular means or methods whereby messages are transferred are not essential to the present invention, and it is anticipated that any technique may be employed in this regard. The lines may be example be taken to represent communication means, in which case they might be realized in a variety of exemplary ways including conductive paths, fibre optic links, infra-red transmission, or paths through a packet switched network; also suitable drivers, modems, or other appropriate interfaces may be required at the ends of such lines, as are well-known in the art. Alternatively, the lines may be taken to stand for a message transfer step.

First key generation means 113 transforms a security parameter on line 102 to a key pair for the Certification Authority. The key pair consists of a public key, output on line 106, and a secret key, output on line 105. The transformation of key generation means 113 depends on, amongst others, random number generator 119.

Second key generation means 112 transforms a security parameter on line 101 to a public key, output on line 103, and a secret key, output on line 104. Typically, the security parameter indicates the binary size of the outputs on lines zoo and 104. The transformation of key generation means 112 from the security parameter on line 101 to the keys on lines 103 and 104 depends on, amongst others, random number generator 118. The outputs of the key generation means will be certified by certificate issuing means 114, as detailed next.

Certification issuing means 114 takes three inputs, on lines 103, 104 and 105. The input on line 103 is the public key output by key generation means 112, and the input on line 104 is the secret key output by key generation means 112. The input on line 105 is the secret key of the Certification Authority output by key generation means 113. Certificate issuing means 114 transforms these three inputs to a secret-key certificate on the public key of line 103. This secret-key certificate is a digital signature of the secret key of line 104, and is output on line 107. Not displayed is an optional random generator in certificate issuing means 114, although the preferred embodiments that are described in detail use randomness in the certificate issuing means.

The certificate, output on line 107, is fed into certificate verification means 116, together with the public key that was output by key generation means 112 on line 103. The public key of the Certification Authority on line 106 is also fed into certificate verification means 116. The certificate verification means outputs a binary value on line 110, which is to be interpreted as a verdict about the correctness of the inputs on lines 103 and 107. In the block diagram, the input on line 107 to certificate verification means 116 is the output of certificate issuing means 114, and the input on line 103 is the same as the input to certificate issuing means 114. Hence, the verdict on line 110 will in this case be affirmative ("yes"). Not displayed is an optional random generator in certificate verification means 116. The preferred embodiments that are described in detail do not use randomness in the certificate verification means. It is conceivable that for certain applications it may be necessary to incorporate randomness in the certificate verification means.

The public key of the Certification Authority on line 106 is fed into certificate simulating means 115. Depending on, amongst other, random number generator 120, the certificate simulating means 115 transforms the input on line 106 to a public key on line 109, and a secret key certificate on this public key line 108. When the two outputs of certificate simulating means 115, and the public key of the Certification Authority on line 106, are fed into certificate verification means 177, a binary value is output on line 111. This output is a verdict about the correctness of the inputs on lines 109 and 108, and will in the displayed situation be affirmative ("yes"). Certificate verification means 117 is the same as means 116, as are all its input and output lines, and has been drawn twice only to emphasize that the certificate verification means cannot distinguish between a secret-key certificate output by certificate issuing means 114, and a secret-key certificate that is output by certificate simulation means 115.

A variety of exemplary secret-key certificate systems for each of two preferred embodiments will now be provided. The Certification Authority will henceforth be abbreviated as CA, and a party in the system to $\mathcal{U}$ (for "user"). In both preferred embodiments, the various secret-key certificates that will be described are constructed from a class of signature schemes that is well-known in the art, henceforth referred to as Fiat/Shamir type signatures, by applying an inventive general construction technique. (Fiat/Shamir type signature schemes are signature schemes that are derived from secure three-transmission identification schemes of the challenge-responses type, by taking the challenge as a one-way hash of at least the message and information provided by the prover in the first transmission. See, Fiat, A. and Shamir, A., "How to prove yourself: practical solutions to identification and signature problems," Crypto'86, Springer-Verlag (1987 ), pp. 186–194. References to Fiat/Shamir type signature schemes that are well-known in the art are provided at in the detailed description.)

This inventive technique will now be described, and will henceforth be referred to as the "general construction technique."

General Construction Technique

A triple consisting of a secret key of $\mathcal{U}$, a matching public key of $\mathcal{U}$, and a secret-key certificate on the public key of $\mathcal{U}$, is characterized by (1) the signature scheme that is used by the CA and (2) the type of key pair of $\mathcal{U}$ that is certified. Denoting the public key of $\mathcal{U}$ by h, and that of the CA by $h_0$, a secret-certificate on h, when constructed by applying the general construction technique to a Fiat/Shamir type signature scheme, is in effect a signature of this underlying Fiat/Shamir type on the message h, made with a secret key that corresponds, under the signature scheme used by the CA, to public key $h_0 h$.

As will be appreciated, the general certificate simulation technique for the resulting secret-key certificates consist of generating h as $h_0^{-1} h'_0$, such that one knows a secret key that corresponds to $h'_0$ under the signature scheme used by the CA. This enables one to generate pairs consisting of a public-key and a secret-key certificate on the public key, without cooperation of the CA.

As will be appreciated, the examples illustrate techniques and concepts of the present invention, but they are only intended to be suggestive and not limiting in any way. For example, other construction techniques than the one described in the preceding paragraphs, or variations thereof, may be used as well. An example of this will be provided at the end of the first preferred embodiment.

FIRST PREFERRED EMBODIMENT

In the first preferred embodiment computations are performed in a (multiplicatively written) group of prime order q, for which efficient algorithms are known to multiply, determine equality of elements test membership, and to randomly select elements. This group will henceforth be denoted by $G_q$. No feasible methods should be known to compute discrete logarithms in $G_q$. Various types of such groups are known. For example, one can take the unique subgroup of order q of $Z_p^*$, where p is a prime number such that q is a divisor of p−1. Another example is an elliptic curve over a finite field. For this reason, no explicit choice for $G_q$ is made in the descriptions.

An expression such as $g^x$ should be understood to be a computation in $G_q$. In case computations modulo q are performed, (as, for example, in $r_0=c(x_0+x)+w_0$ mod q), the modulo operator will be denoted explicitly. In case an element is chosen from a group, it is implicitly assumed that it is the smallest positive representative. The same holds for outcomes of computations.

1. First Exemplary Secret-Key Certificate

A first exemplary secret-key certificate in the first preferred embodiment, constructed by applying the general construction technique to the Schnorr signature scheme (See, Schnorr, C.,"*Efficient Signature Generation by smart Cards,*" Journal of Cryptology, Vol. 4, No. 3 (1991), pp. 161–174), will now be described in detail.

Key generation means of the KAC: The secret key of the CA is a number $x_0$ in $Z_q$, and the corresponding public key is $(g,h_0)$ in $G_q \times G_q$, where g is a generator of $G_q$ and $h_0$ denotes $g^{x_0}$. Preferably $x_0$ is chosen uniformly at random in $Z_q$, and g is chosen uniformly at random in $G_q \setminus \{1\}$.

The pair $(g,h_0)$ and the description of $G_q$ are made publicly known by the CA. The CA also makes publicly known a hash-function $\mathcal{H}$, which maps its arguments to, say, $Z_2^t$, for some appropriate security parameter t (as will be clear to those of ordinary skill in the art, instead of $Z_2^t$, any $Z_l$ for sufficiently large l can be chosen—this choice is merely for concreteness). This function should meet the requirements that are believed to make the Schnorr signature scheme secure. Preferably $\mathcal{H}$ is collision-free: this means that it is unfeasible to compute two distinct arguments that are mapped by $\mathcal{H}$ to the same outcome. Functions that are believed to be collision-free are well-known to those of ordinary skill in the art.

Certificate verification means: A secret-key certificate on a public key h in $G_q$ of $\mathcal{U}$ is a pair (c,r) in $Z_2^t \times Z_q$ such that c is equal to $\mathcal{H}(h,g^r(h_0h)^{-c},I)$. Here, I is a string containing the name of $\mathcal{U}$, and possibly additional information such as address, employer, electronic mail, and a list of access rights. The incorporation of I in the hash-value is not strictly necessary, but may be required in practice. As will be clear to those of ordinary skill in the art, it could have been left out of the hash-value as well.

As will be clear to those of ordinary skill in the art, the secret-key certificate can alternatively be taken to be a pair (a,r) in $G_q \times Z_q$. In that case, the pair is a secret-key certificate on h if $g^r(h_0h)^{-c}$ is equal to a, where c is computed as $\mathcal{H}(h,a,I)$.

As will be clear to those of ordinary skill in the art, the secret-key certificate has been constructed from the Schnorr identification scheme by applying the general construction technique: the certificate is in effect a Schnorr signature on h made with secret key $\log_g(h_0h)$, corresponding to the public key $h_0h$.

Key generation means of $\mathcal{U}$: In addition to the signature scheme employed by the CA, the type of key pair of $\mathcal{U}$ must be specified in order to define the secret-key certificate. In a general form, the secret key of $\mathcal{U}$ can be taken to be a tuple $(x_1, \ldots x_k)$, such that each $x_i$ is in $Z_q$, and h is equal to $\Pi$. Here, $g_1, \ldots, g_k$ are randomly chosen generators of $G_q$ (they need not all be different from g), that are published by the CA in addition to g, $h_0$, and the descriptions of $G_q$ and $\mathcal{H}$.

For each $g_i$ ($1 \leq i \leq k$), the CA should preferably know $\log_g g_i$ (in order to be able to conduct the issuing protocol). Hereto, the CA mag generate $g_1, \ldots g_k$ as follows: it generates at random $y_1, \ldots y_k$ in $Z_q$, and set $g_i$ equal to $G^{y_i}$. (The CA can take one of the numbers $g_i$ equal to g; as will be demonstrated by the flowchart of FIG. 6, such a choice allows restrictive blinding of the issuing protocol. As will be obvious to those of ordinary skill in the art, instead of taking one of the $g_i$'s equal to g, the same effect is obtained by taking this $g_i$ equal to a publicly known power of g.) Observe that the secret key that corresponds to the public key $h_0h$, in the signature scheme employed by the CA, is the number $\log_g(h_0h)$, which is equal to $x_0+\Sigma_{i=1}^k y_i x_i$ mod q; if the described generation process for $g_1, \ldots, g_k$ is used, then the CA can compute this number.

In practice, one may want to use a simpler form of key pair. The simplest form is one in which the secret key of $\mathcal{U}$ is a number x in $G_q$, and the public key h is equal to $g^x$ (that is, there is only one $g_i$, and it has been taken equal to g). This enables $\mathcal{U}$ to perform such cryptographic tasks as computing Schnorr signatures and proving knowledge of his secret key (three detailed examples will be provided below). Another simple form is one in which the secret key of $\mathcal{U}$ is a pair $(x_1, x_2)$, such that h is equal to $g_1^{x_1}g_2^{x_2}$. Here, as mentioned, one of $g_1$ or $g_2$ may be taken equal to g (or both, but then there is no advantage in this form over the more efficient form where h is equal to $g^x$). This form also enables $\mathcal{U}$ to perform cryptographic tasks such as computing signatures and proving knowledge of his secret key. As will be demonstrated in the flowchart of FIG. 6, this second form is of particular importance for the construction of restrictive blind signature protocols, in that for such a protocol it is required that $g_1$ is taken equal to g (or a publicly known power of g), and $\mathcal{U}$ should not be able to compute $\log_g g_2$ or $\log_{h_0} g_2$.

Certificate simulating means; Those of ordinary skill in the art may wish to verify that anyone can feasibly generate pairs h,(c,r) such that the verification relation holds, by taking h equal to $h_0^{-1}g^s$ for an arbitrary s in $Z_q$, and a equal to $g^t$ for an arbitrary t in $Z_q$; the pair (c,sc+t mod q), with c equal to $\mathcal{H}(h,a,I)$, then is a secret-key certificate on h. However, the ability to feasibly generate such pairs together with a secret key, that corresponds to the public key h according to one of the key generation schemes for $\mathcal{U}$ described in the preceding three paragraphs, enables one to forge Schnorr signatures.

As will be appreciated, this simulation is completely in accordance with the certificate simulation method that has already been detailed for the general construction method. Since this simulation method works for all the secret-key certificates that are derived from Fiat/Shamir type signatures by using the general construction technique, from now on no mention will be made of it for the other secret-key certificate that will be provided.

1.1 Examples for the First Exemplary Secret-Key Certificate

A complete secret-key certificate system also requires the description of a certificate issuing protocol, in addition to the description of the secret key certificate itself. A variety of exemplary protocols for issuing the described secret-key certificate can be constructed. Each such certificate issuing protocol can be characterized by the degree by which $\mathcal{U}$, to whom the certificate is issued by the CA, can "randomize" and "blind" the secret key, the public key, and the secret-key certificate. Before providing exemplary embodiments for various certificate issuing protocols, though, a few examples are provided that will help those of ordinary skill in the art to appreciate how the described secret-key certificate may be used in practice.

Without loss of generality, it will be assumed in the examples that a public-key directory is used. (Alternatively, the public keys and secret-key certificates on the public keys may be sent on request.) The entries in the public-key directory will be of the following form:

| User | (Public key, Certificate) |
| --- | --- |
| $I_1$ | $h_1, (c_1, r_1)$ |
| $I_2$ | $h_2, (c_2, r_2)$ |
| . | . |
| . | . |
| . | . |
| $I_k$ | $h_k, (c_k, r_k)$ |

By virtue of the simulatability of secret-key certificates, any one of the entries could have been generated without cooperation of the CA.

As will be clear to those of ordinary skill in the art, the numbers $I_i$ in the entries of the public-key directory need not refer to the identity of the party associated with the entry: instead, they may refer to a pseudonym of the party, and the party may have a plurality of such pseudonyms.

For simplicity, in each of the examples it will be assumed that the key pair of $\mathcal{U}$ is of the simplest form; the secret key is a number x in $\mathbb{Z}_q$, and the corresponding public key h is equal to $g^x$. As will be clear to those of ordinary skill in the art, similar examples can be provided when $\mathcal{U}$ uses a different type of key pair. In particular, many techniques and examples in which the more general form of key pair for $\mathcal{U}$ is used, are described and claimed in patent application Ser. No. 08/203,231.

EXAMPLE 1

Suppose that user $\mathcal{U}_1$ wants to transfer an encrypted message m in $G_q$ to $\mathcal{U}_2$ (by electronic facsimile, electronic mail, or any other suitable medium). The encryption scheme which is used is the ElGamal scheme (See, ElGamal, T., "*A public key cryptosystem and a signature scheme based on discrete logarithms,*" IEEE Transactions on Information Theory, Vol. It-31, No. 4, July 1985, pp. 469–472) in the group $G_q$. From the public-key directory, $\mathcal{U}_1$ retrieves the public key $h_2$ of $\mathcal{U}_2$, and the string $(c_2, r_2)$. If $c_2$ is equal to $\mathcal{H}(h_2, g^{r_2}(h_0 h_2)^{-c_2}, I_2)$, then $\mathcal{U}_1$ can safely transfer the encrypted message to $\mathcal{U}_2$. Hereto, he generates at random a number s in $\mathbb{Z}_q$, and transfers the pair $)g^s, h_2^s m)$ to $\mathcal{U}_2$ can decrypt and retrieve m, then he must know $\log_g h_2$ (as will be clear to those of ordinary skill in the art, this holds under the Diffie-Hellman key exchange assumption in $G_q$, and for randomly chosen m). This in turn implies that he could not have generated $(h_2, (c_2, r_2))$ by himself. In other words, $\mathcal{U}_1$ can rest assured that $\mathcal{U}_2$ can recover m if and only if the key pair of $\mathcal{U}_2$ has been certified by the CA. Of course, in practice bidirectional communication between $\mathcal{U}_1$ and $\mathcal{U}_2$ will readily reveal to both parties whether the keys of the other party have been certified by the CA.

EXAMPLE 2

Suppose that $\mathcal{U}_2$ digitally signs a message m for $\mathcal{U}_1$, using the Schnorr signature scheme (alternatively, the ElGamal signature scheme can be used). $\mathcal{U}_1$ receives from $\mathcal{U}_2$ pair (c,r) such that c is equal to $\mathcal{H}(m, g^r h_2^{-c})$. If the public key $h_2$ of $\mathcal{U}_2$ is listed in the public-key directory together with a pair $(c_2, r_2)$ for which $c_2$ is equal to $\mathcal{H}(h_2, g^{r_2}(h_0 h_2)^{-2}, I_2)$, then the fact that $\mathcal{U}_2$ can compute this signature also informs $\mathcal{U}_1$ that the key pair of $\mathcal{U}_2$ has been certified by the CA (unless the Schnorr signature scheme can be broken, but in that case the signature scheme of the users itself is also insecure). As will be appreciated, this fact can be verified by anyone and so has legal significance, as it is unfeasible to forge a triple consisting of (1) a pair consisting of a public key and a secret-key certificate on the public key, (2) a message, and (3) a digital signature on the message made with the secret key corresponding to the forged certified public key.

EXAMPLE 3

Suppose that $\mathcal{U}_2$ wants to prove to $\mathcal{U}_1$ that his entry in the public-key directory has been certified by the CA, without leaving $\mathcal{U}_1$ with a transcript of the proof that can be used to transfer to conviction to others. $\mathcal{U}_2$ hereto proves knowledge of the secret key $\log_g h_2$ to $\mathcal{U}_1$ in a zero-knowledge protocol, which can be done, for example, as follows. $\mathcal{U}_2$ transfers a number a in $G_q$ to $\mathcal{U}_1$, where a is equal to $g^w$ for a randomly chosen w in $\mathbb{Z}_q$. $\mathcal{U}_1$ responds with challenge c randomly chosen from a predetermined small range, said {0.1}, and transfers it to $\mathcal{U}_2$. $\mathcal{U}_2$ must respond with $c \log_g h_2 + w \bmod q$, denoted by r for further reference. The correctness of the response can be verified by $\mathcal{U}_1$ by verifying whether $g^r h_2^{-c}$ is equal to a. This three-move interaction is repeated a substantial number of times, and if $\mathcal{U}_2$ can always respond correctly then he must know $\log_g h_2$, thereby proving that the entry in the directory has been certified by the CA. As is well-known in the art, this is a zero-knowledge protocol. The conviction of $\mathcal{U}_1$ cannot be transferred: transcripts of executions of this protocol are feasible to generate together with entries in the public-key directory, with indistinguishable probability distribution.

1.2. First Exemplary Certificate Issuing Protocol

Certificate issuing means: Various certificate issuing protocols for issuing the described secret-key certificate will now be described. As before, for explicitness it will be assumed in each of these protocols that the key pair of $\mathcal{U}$ is of the simplest form; the secret key is a number x in $\mathbb{Z}_q$, and the corresponding public key h is equal to $g^x$. Those of ordinary skill are believed to be able to straightforwardly apply the inventive techniques to suit the other types of key pairs for $\mathcal{U}$, described previously. Recall that the secret-key certificate that will be issued to $\mathcal{U}$ by the CA is a pair (c,r) in $\mathbb{Z}_2^l \times \mathbb{Z}_q$ such that c is equal to $\mathcal{H}(h, g^r(h_0 h)^{-c}, I)$, where h is the public key of $\mathcal{U}$.

Figure 2:
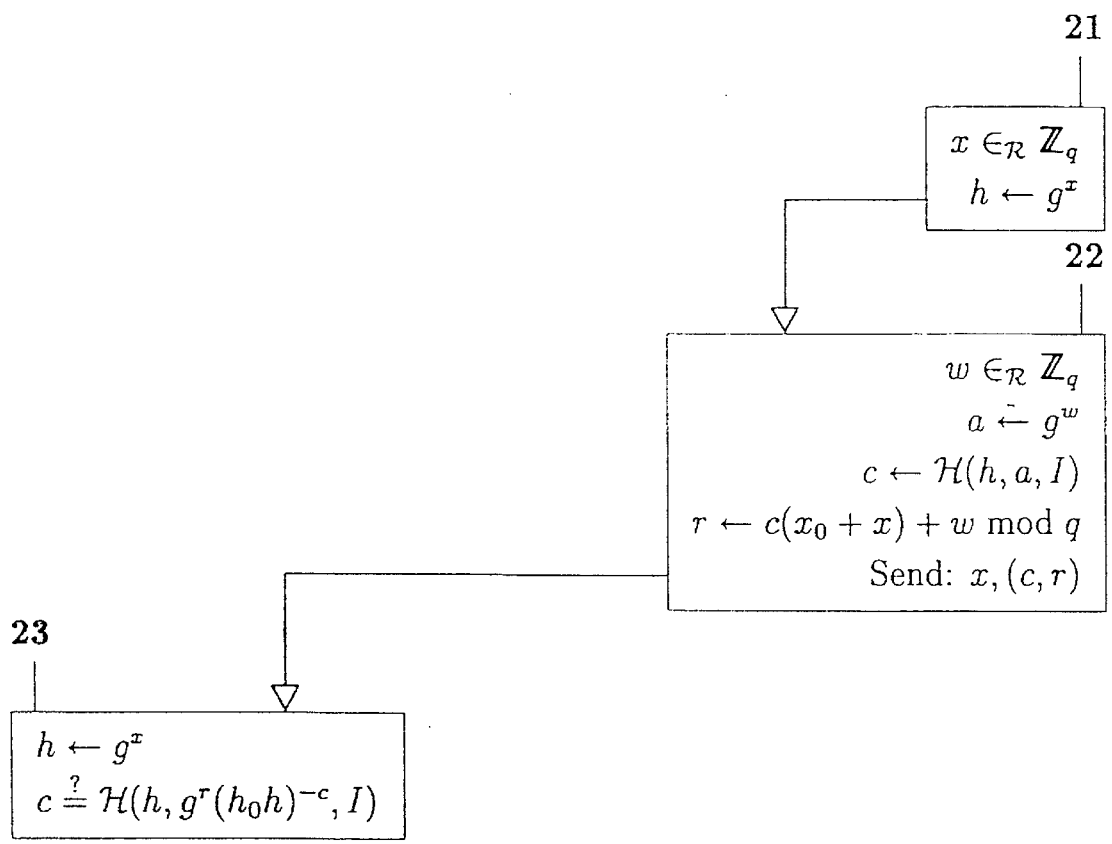
FIG. 2 shows a flowchart of a secret-key certificate issuing protocol for a first preferred embodiment in accordance with the teachings of the present invention.

Turning now to FIG. 2, a flowchart of a first secret-key certificate issuing protocol in the first preferred embodiment will not be described in detail.

Box 21 first shows the CA generating a secret key x in $\mathbb{Z}_q$ for use by $\mathcal{U}$. As indicated in the second line, the corresponding public key h of $\mathcal{U}$ is taken equal to $g^x$. It will be clear to those of ordinary skill in the art that x may alternatively be generated by $\mathcal{U}$ and then communicated to the CA, or $\mathcal{U}$ and the CA can generate it together, for example in such a manner that x is mutually random.

Box 22 first shows the CA generating at random a number x in $\mathbb{Z}_q$. The second line shows the CA computing $g^w$, which is denoted by a for further reference. The third and fourth lines show the CA computing $\mathcal{H}$(h,a,I), which is denoted by c, and $c(x_0+x)+w$ mod q, which is denoted by r. The CA then transfers the secret key x and the pair (c,r) to $\mathcal{U}$ computing his public key h, by setting it equal to $g^x$. The second line indicates that $\mathcal{U}$ verifies if c is equal to the hash-value of the triple $(h, g^r(h_0h)^{-c}, I)$.

Clearly, if the equality holds then the pair (c,r) is a secret-key certificate on the public key h of $\mathcal{U}$, such that $\mathcal{U}$ knows the secret key corresponding to h.

1.3. Second Exemplary Certificate Issuing Protocol

In the certificate issuing protocol of FIG. 2, the CA must know the secret key of $\mathcal{U}$. In many circumstances, it is not desirable that any party other than the party associated with the public key knows the corresponding secret key (or any corresponding secret key, if more than one exists). As will be appreciated, the need for the CA to know the secret key can be removed by letting $\mathcal{U}$ perform part of the computations. Note that public-key certificates can always be issued by the CA without interaction and without needing to know the secret key of $\mathcal{U}$, because a public-key certificate is a digital signature on the public key.

Turning now to FIG. 3, a flowchart of a secret-key issuing protocol that hides the secret key of $\mathcal{U}$ from the CA, in the first preferred embodiment, will now be described in detail.

Box 31 first shows $\mathcal{U}$ generating at random a number x in $\mathbb{Z}_q$; this will be his secret key. The second line shows $\mathcal{U}$ computing the corresponding public key h by setting it equal to $g^x$. $\mathcal{U}$ then transfers h to the CA, as indicated by the third line.

Box 32 first shows the CA generating at random a number w in $\mathbb{Z}_q$. The second line shows the CA computing $g^w$, which is denoted by a for further reference. The third and fourth lines show the CA computing $\mathcal{H}$(h,a,I), which is denoted by c, and $cx_0+w$ mod q, which is denoted by $r_0$. The fifth line indicates that the CA transfers the pair $(c, r_0)$ to $\mathcal{U}$.

Box 33 first shows $\mathcal{U}$ verifying whether c is equal to the hash-value of the triple $(h, g^r{}_0 h_0{}^{-c}, I)$. As described by the second line, if this is the case then $\mathcal{U}$ computes $r_0+cx$ mod q, which is denoted by r.

As can easily be verified by those of ordinary skill in the art, the pair (c,r) is a secret-key certificate on the public key h, such that $\mathcal{U}$ knows the secret key corresponding h.

In this exemplary protocol, the secret key x can be freely chosen by $\mathcal{U}$. It will be clear to those of ordinary skill in the art that the CA can randomize the secret key of $\mathcal{U}$, for instance by using $h^{x'}$ instead of h in Box 32. Here, x' is randomly chosen by the CA from $\mathbb{Z}_q$, and made known to $\mathcal{U}$ only after the CA has received h (in addition, the CA can be requested to transfer a commit on x' to $\mathcal{U}$ before $\mathcal{U}$ reveals h). In that case, the secret key of $\mathcal{U}$ is equal to x+x'mod q.

1.4. Third Exemplary Certificate Issuing Protocol

Since there exist many secret-key certificates (c,r) on the same public key, the CA may choose a particular one and encode information in it that can be decrypted by insiders. (As will be clear to those of ordinary skill in the art, this is not a simple task for the CA, because no trapdoor information is known for $G_q$. However, the CA can encode information in part of the bits of (c,r) by random trial and error.) As will be appreciated, this subliminal channel can easily be prevented.

Figure 4:
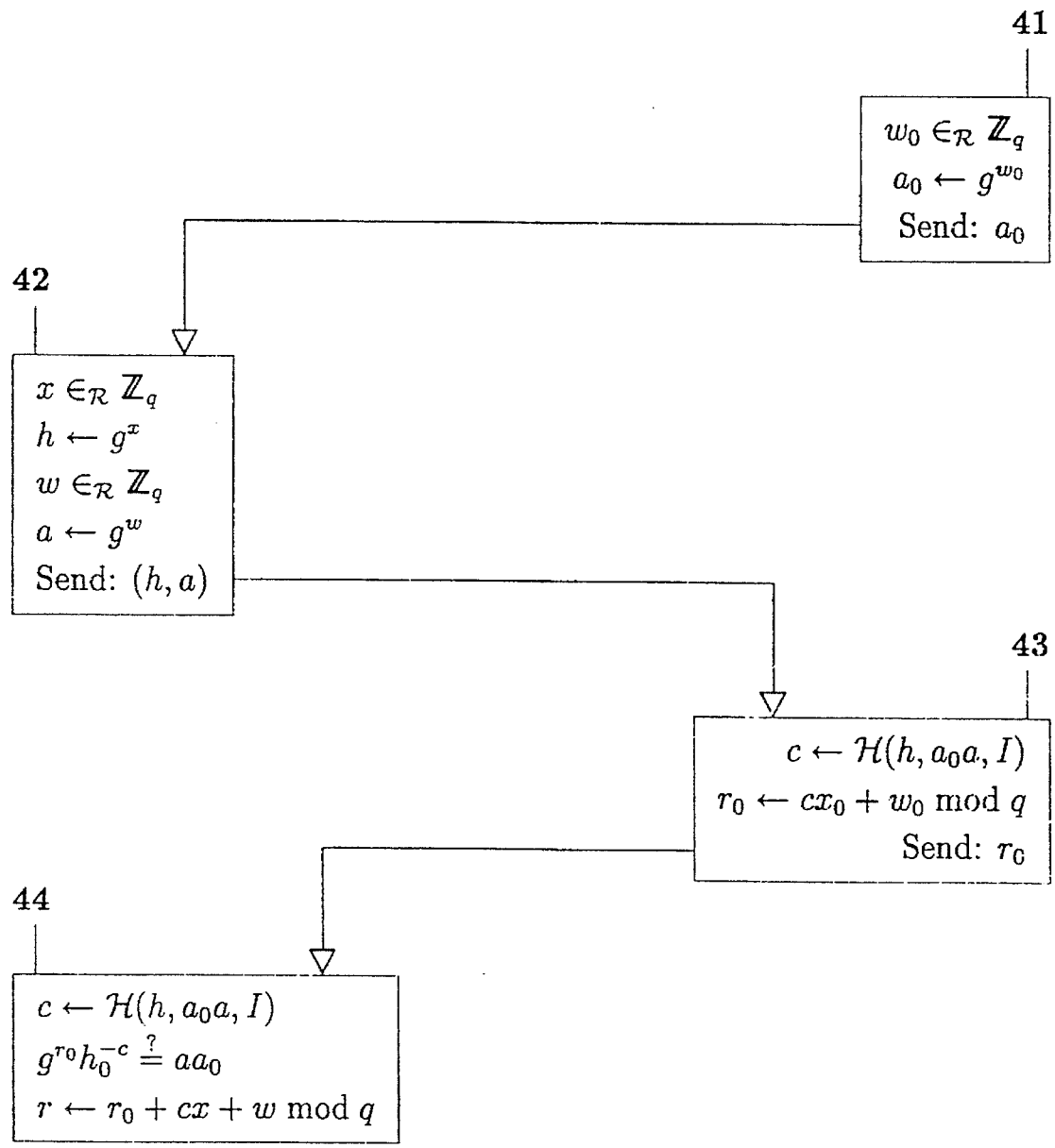
FIG. 4 shows a flowchart of a secret-key certificate issuing protocol, such that the subliminal channel in the secret-key certificate is prevented, for the first preferred embodiment in accordance with the teachings of the present invention.

Turning now to FIG. 4, a flowchart of a secret-key issuing protocol that hides the secret key from the CA and prevents the subliminal channel, in the first preferred embodiment, will now be described in detail.

Box 41 first shows the CA generating at random a number $w_0$ in $\mathbb{Z}_q$. The second line shows the CA computing $g^{w_0}$, which is denoted by $a_0$ for further reference. The third line indicates that the CA then transfers $a_0$ to $\mathcal{U}$.

Box 42 first shows $\mathcal{U}$ generating at random a number x in $\mathbb{Z}_q$; this will be his secret key. The second line shows $\mathcal{U}$ computing the corresponding public key h by setting it equal to $g^x$. The third line shows $\mathcal{U}$ generating at random a number w in $\mathbb{Z}_q$, and the fourth line shows $\mathcal{U}$ computing $g^w$, which is denoted by a. Finally, as described in the fifth line, $\mathcal{U}$ transfers the pair (h,a) to the CA.

Box 43 first shows the CA computing $\mathcal{H}$(h,$a_0$a, I), which is denoted by c for further reference. The second line shows the CA computing $cx_0+w_0$ mod q, which is denoted by $r_0$. As described by the third line, the CA then transfers $r_0$ to $\mathcal{U}$.

Box 44 first shows $\mathcal{U}$ computing c as did the CA in the first line of Box 43. The second line indicates that $\mathcal{U}$ verifies whether $aa_0$ is equal to $g^{r_0} h_0{}^{31\ c}$. As the third line displays, if this is the case then $\mathcal{U}$ computes $r_0+cx+w$ mod q, which is denoted by r.

As can easily be verified by those of ordinary skill in the art, the pair (c,r) is a randomized secret-key certificate on the public key h (meaning that the CA could not have encoded any information in it), such that $\mathcal{U}$ knows the secret key corresponding to h.

Clearly, the technique that prevents the need for the CA to know the secret key of $\mathcal{U}$ is independent of the technique to prevent the subliminal channel. Those of ordinary skill in the art are believed to be able to straightforwardly apply the described technique to prevent the subliminal channel in conjunction with the protocol of the flowchart of FIG. 2.

It will be obvious to those of ordinary skill that $\mathcal{U}$ in Box 42 could transfer w to the CA, instead of a. In Box 43 the CA can then compute $cx_0+w_0+w$ mod q itself, to which $\mathcal{U}$ now must add only xx module q. Because the number w is smaller in size than the number a, this reduces the number of bytes that must be transmitted. On the other hand, an extra computational cost is incurred by the CA, who now has to perform one additional exponentiation (i.e., raising to a power) in $G_q$, whereas the computational cost for $\mathcal{U}$ is virtually not reduced.

1.5. Fourth Exemplary Certificate Issuing Protocol

In the issuing protocols described thus far, the CA knows the public key of $\mathcal{U}$. For ordinary public-key directory applications, this is usually by definition the case, since anyone in such applications should be able to associate the public key with $\mathcal{U}$.

In cryptographic mechanism for transfer of credentials, however, no public-key directories are used; the information representing a credential is only shown by the owner of the credential if he wants to demonstrate possession of his credential to a recipient. A commonly used mechanism is one in which a public key and a public-key certificate on the public key are transferred; the secret key of $\mathcal{U}$ corresponding to his public key enables $\mathcal{U}$ to do additional things such as sign the transfer, or prove possession of additional information (in on-line mechanisms $\mathcal{U}$ might do without needing to know a secret key, and the public key can be a message or a one-way has thereof). The credential is issued by the CA, and the the of credential that is issued can for instance be denoted by the type of signature that the CA computes. The certificate of the CA proves the validity of the credential to the recipient, and a signature made by $\mathcal{U}$ with his secret key proves that $\mathcal{U}$ willingly transferred the credential to the recipient.

If the transfer mechanism is to be privacy-protected, then the CA should not know what the public key and the certificate are, because these are revealed when transferred. Hence, appropriate blinding techniques must be used. As will be appreciated, in the case $\mathcal{U}$ at transferring time must perform some additional action based on the secret key (and so the credential that is issued is represented by a triple consisting of a secret key, a matching public key, and a certificate on the public key), secret-key certificates can be used instead of public-key certificates. This holds in particular for restrictive blind signature protocols (described and claimed in patent application Ser. No. 08/203,231), as will be demonstrated. Informally, the main reason for this resides in the fact that the relation between the secret-key certificate and the public key can be constructed by $\mathcal{U}$ himself; the public key and the secret-key certificate are not "tied" together as much as a public key and a public-key certificate, giving the protocol designer extra flexibility in designing an appropriate blinded issuing protocol.

Figure 5:
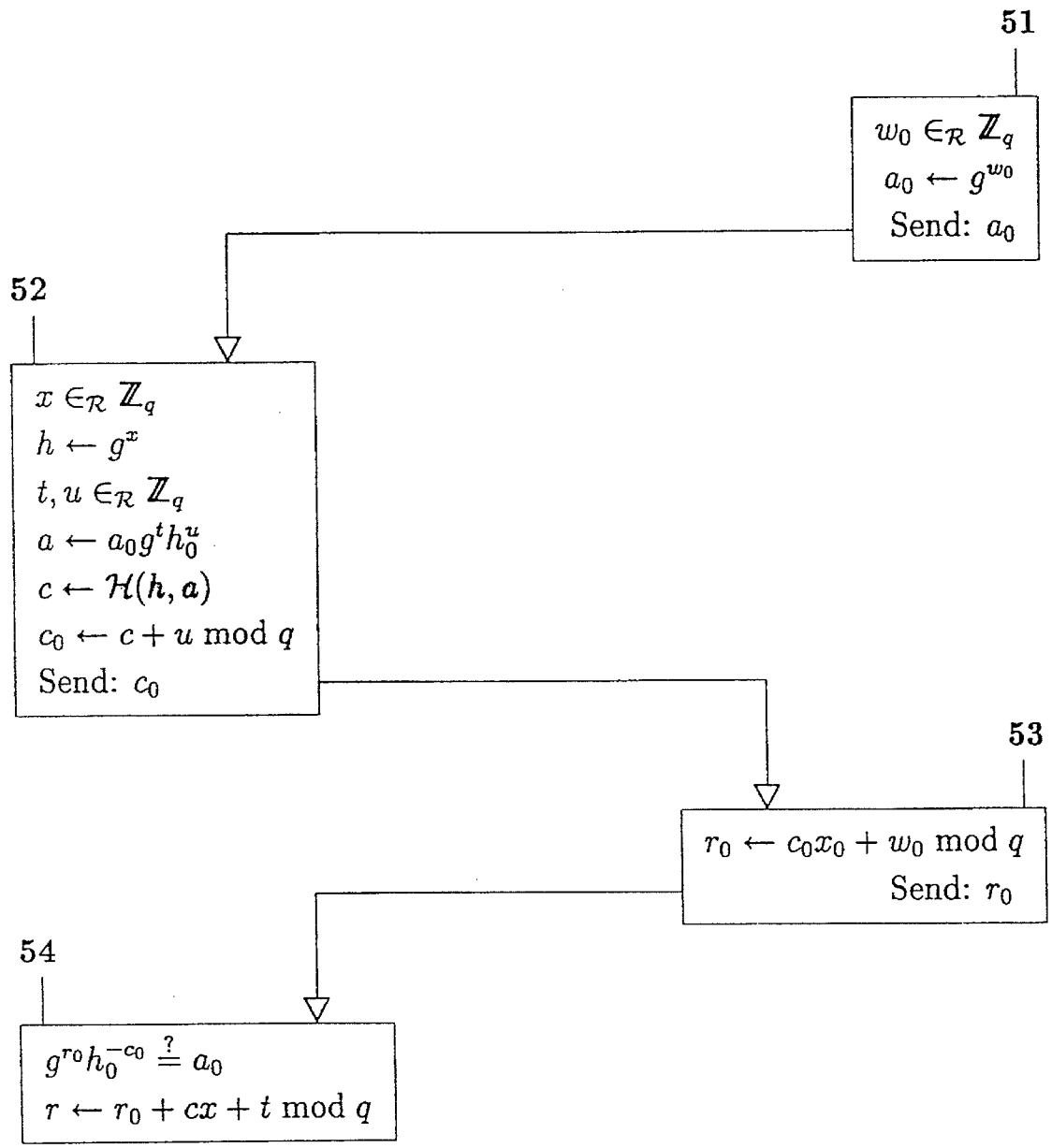
FIG. 5 shows a flowchart of a secret-key certificate issuing protocol, such that the recipient fully blinds the issued information, for the first preferred embodiment in accordance with the teachings of the present invention.

Turning now to FIG. 5, a flowchart of a fully blinded secret-key issuing protocol in the second preferred embodiment will now be described in detail.

Contrary to the flowcharts of the preceding figures the string I should obviously not be hashed along with h and a if it reveals identifying information about $\mathcal{U}$, such as his name; otherwise, there would be no point in blinding the certificate issuing protocol. Although the CA may require $\mathcal{U}$ to hash along a string I that, for instance, indicates another party that $\mathcal{U}$ wishes to transfer the received information to, for convenience the string I will henceforth be omitted.

Box 51 first shows the CA generating at random a number $w_0$ in $\mathbb{Z}_q$. The second line shows the CA computing $g^{w_0}$, which is denoted by $a_0$ for further reference. As described by the third line, the CA then transfers $a_0$ to $\mathcal{U}$.

Box 52 first shows $\mathcal{U}$ generating at random a number x in $\mathbb{Z}_q$; this will be his secret key. The second line shows $\mathcal{U}$ computing the corresponding public key h, by setting it equal to $g^x$. The thid line shows $\mathcal{U}$ generating at random two numbers t,u in $\mathbb{Z}_q$. Using these random numbers, the fourth line shows how $\mathcal{U}$ blinds $a_0$, by computing $a_0 g^t h_0^u$; this number is denoted by a for further reference. The fifth line shows $\mathcal{U}$ computing $\mathcal{H}(h,a)$, which is denoted by c, and blinding it, as described by the sixth line, to c+u mod q; this number is denoted by $c_0$ for further reference. As described by the seventh line, $\mathcal{U}$ then transfers $c_0$ to the CA.

Box 53 first shows the CA computing $c_0 x_0 + w_0$ mod q, which is denoted by $r_0$ for further reference. As described by the second line, the CA then transfers $r_0$ to $\mathcal{U}$.

Box 54 first shows $\mathcal{U}$ verifying whether $g^{r_0} h_0^{-c_0}$ is equal to $a_0$. As described by the second line, if this is the case then $\mathcal{U}$ computes $r_0 + cx + t$ mod q, which is denoted by r.

As can easily be verified, (c,r) is a secret-key certificate on the public key h of $\mathcal{U}$, such that $\mathcal{U}$ knows the secret key corresponding to h, and views of the CA in executions of this issuing protocol are independent from pairs (h,(c,r)). In other words, this is a fully blinded secret-key issuing protocol: secret key, public key, and certificate are all blinded by $\mathcal{U}$. (Obviously, since secret key and public key of $\mathcal{U}$ are in unique correspondence here, they are not independently blinded; what is meant is that the CA has no information whatsoever about the pair consisting of the secret key and the public key).

As will be appreciated, a particular application of fully blinded secret-key certificate issuing protocols is the following. To ensure that users will be unable to tell whether entries in a public-key directory have been certified by the CA or not, the manufacturer of a public-key directory on, say, CD-ROM might gather the entries in the Directory by letting the parties associated with the public keys submit their own public keys and associated secret-key certificates, as they wish them to appear on the CD-ROM (in this way, anyone knows that the public-key directory has been opened for public writing). In order to prevent even the CA from being able to distinguish between entries that it certified and entries that it did not certify, users should anonymously retrieve their certified keys from the CA by performing a fully blinded issuing protocol, such as that of FIG. 5. If the CA wants to be ensured that each user can have no more than one certified key pair, then it can see to it that the users must perform the issuing protocol under pseudonym (suitable pseudonym techniques are described and claimed in patent application Ser. No. 08/203,231). As mentioned earlier, the entries in the public-key directory need not corresponding to the real identities of parties, but may refer to digital pseudonyms.

1.6. Fifth Exemplary Certificate Issuing Protocol

The certificate issuing protocols that have been described thus far in effect demonstrate techniques to incorporate various degrees of randomization that can be applied by $\mathcal{U}$. In each of the protocols, the output is a triple consisting of a secret key x, a matching public key h, and a secret-key certificate (c,r) on h. In the flowchart of FIG. 2, none of these three items can be randomized by $\mathcal{U}$. The flowchart of FIG. 3 may be considered as one in which the first item (the secret key) is randomized by $\mathcal{U}$. In the flowchart of FIG. 4, in addition the secret-key certificate is randomized by $\mathcal{U}$, to prevent the subliminal channel. In the flowchart of FIG. 5, all three items are randomized by $\mathcal{U}$ in order to receive a fully blinded triple (blinding can be seen as randomization in combination with hiding the resulting information from the CA).

A particularly valuable randomization is that in which $\mathcal{U}$ can perfectly blind the public key and the secret-key certificate on the public key, such that the CA gets no information about the pair, but cannot fully blind the secret key corresponding to the public key; more specifically, the secret key of $\mathcal{U}$ is a vector of at least two numbers, and $\mathcal{U}$ will not be able to blind a pre-determined non-constant function of the numbers in the vector. Such an issuing protocol is a restrictive blind signature protocol, as described and claimed in patent application Ser. No. 08/203, 231.

Using the terminology of the present patent application, restrictive blind signature protocols can be of either one of two types: restrictive blind secret-key certificate issuing protocols, and restrictive blind public-key certificate issuing protocols. Examples of both of these types are described and claimed in patent application Ser. No. 08/203,231.

The benefit is of this technique is that, while $\mathcal{U}$ can show a credential (obtained by retrieving a secret key, a matching public key, and a secret-key certificate on the public key, by performing a restrictive blind signature protocol) without enabling traceability by the CA (because the public key and the certificate are fully blinded), appropriate showing protocols (which require $\mathcal{U}$ to perform additional actions with his secret key) can limit the scope of the actions that $\mathcal{U}$ can perform. For instance, (1) by using the public keys, issued in a restrictive blind signature protocol, as pseudonyms, it can be arranged that $\mathcal{U}$ can only transfer credentials between his own pseudonyms; (2) a set of credentials can be encoded into the secret key, implying that $\mathcal{U}$ cannot modify issued credentials; (3) the part of the secret key that cannot be blinded can be uniquely associated by the CA with the identify of $\mathcal{U}$, such that if $\mathcal{U}$ shows the credential a number of times exceeding a predetermined limit then the CA can trace him. In patent application Ser. No. 08/203,231, a wide variety of techniques for transferring credentials, obtained by performing a restrictive blind issuing protocol, are described and claimed.

An interesting aspect of restrictive blind secret-key certificate issuing protocols (contrary to restrictive blind public-key certificate issuing protocols) is that they are not an instance of blind signature protocols as defined in the art. Blind signature protocols, as defined in the art, are issuing protocols in which both the message and the signature of the signer on the message are blinded by the recipient. For a restrictive blind secret-key certificate issuing protocol, the message is the secret key of the recipient, and the signature of the signer on this message is the secret-key certificate. The very essence of secret-key certificates is that the secret-key certificate is not a digital signature on the public key. Hence, as will be clear to those of ordinary skill, a restrictive blind secret-key certificate issuing protocol is not a blind signature protocol, since by definition the recipient is not able to blind the message. This is all the more clear if the information encoded by the CA into the secret key of the recipient is uniquely associated to the identity of the recipient.

Figure 6:
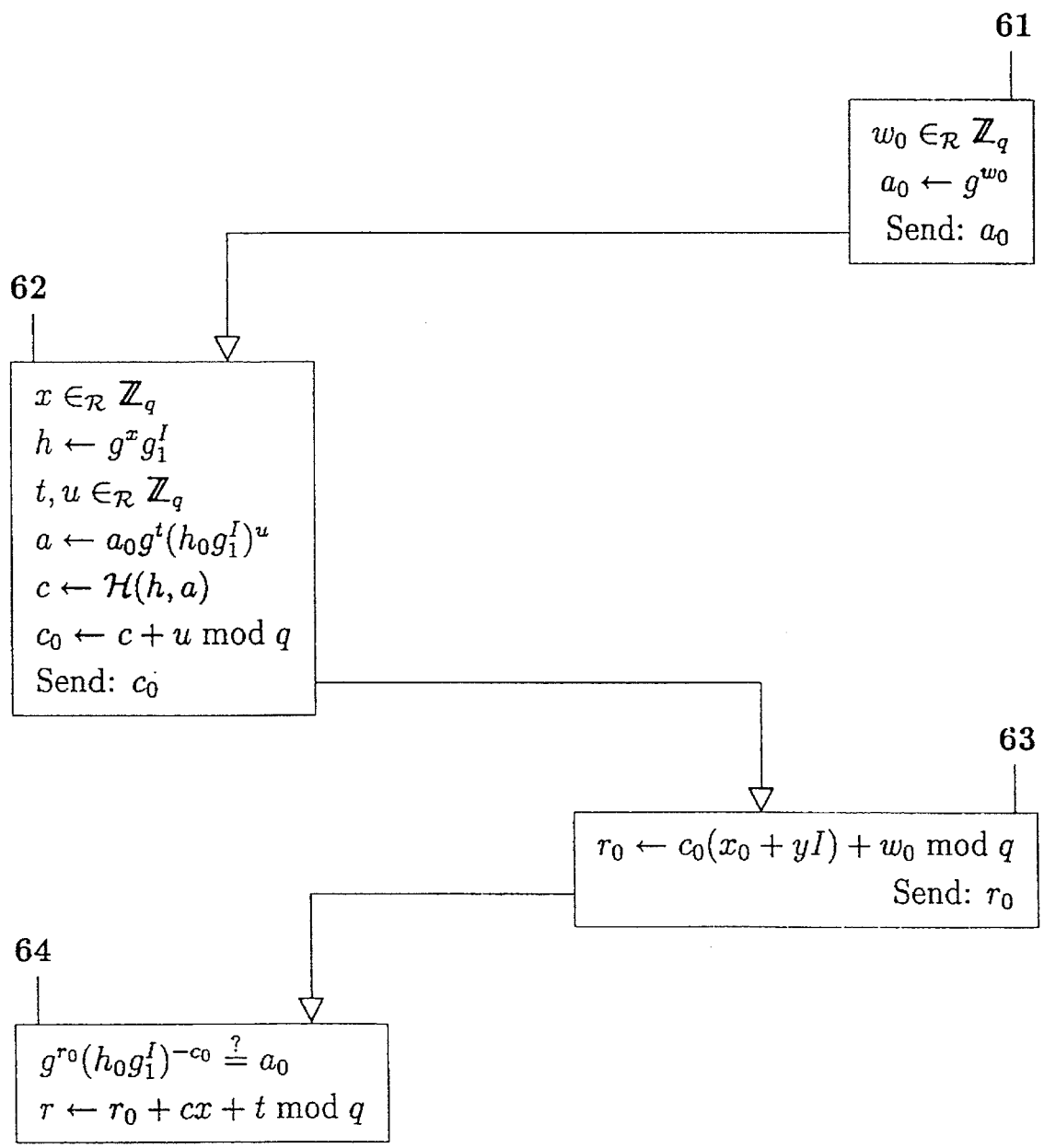
FIG. 6 shows a first flowchart of a restrictive blind secret-key certificate issuing protocol for the first preferred embodiment in accordance with the teachings of the present invention.

Turning now to FIG. 6, a first flowchart of a restrictive blind secret-key certificate issuing protocol for the first preferred embodiment will now be described in detail. This protocol is also described and claimed in patent application Ser. No. 08/203,231, and, as will be appreciated, is included here (using the present notation) to clearly demonstrate that the protocol is a restrictive blind secret-key certificate issuing protocol.

The key pair $\mathcal{U}$ must be different from that used until now, because the secret key must be a vector of at least two numbers. For concreteness, the following choice is made: the secret key of $\mathcal{U}$ is a pair (x,I) in $\mathbb{Z}_q \times \mathbb{Z}_q$ such that $g^x g_1^I$ is equal to h. Here, the CA has generated $g_1$ by generating at random a (secret) number y in $\mathbb{Z}_q$, and setting $g_1$ equal to $g^y$. As will be clear to those of ordinary skill in the art, this implies that it is unfeasible for parties other than the CA to compute $\log_g g_1$.

The second number of this pair, I, will be encoded by the CA into the secret key of $\mathcal{U}$ during the certificate issuing protocol. Although $\mathcal{U}$ is unable to modify I, he will be able to generate x by himself uniformly at random in $\mathbb{Z}_q$. Hence, in effect h is generated at random in $G_q$, independently from I. As described before, the number I may be related to the identify of $\mathcal{U}$, but can also contain unrelated information such as a credential specification.

Box 61 first shows the CA generating at random a number $w_0$ in $\mathbb{Z}_q$. The second line shows the CA computing $g^{w_0}$, which is denoted by $a_0$ for further reference, As described by the third line, the CA then transfers $a_0$ to $\mathcal{U}$.

Box 62 first shows $\mathcal{U}$ generating a number x in $\mathbb{Z}_q$; the pair (x,I) will be his secret key. The second line shows $\mathcal{U}$ computing the corresponding public key h, by setting it equal to $g^x g_1^I$. In addition, as displayed in the third line, $\mathcal{U}$ generates two random numbers t,u in $\mathbb{Z}_q$, which will serve to obtain blinded r and c. The fourth line shows $\mathcal{U}$ computing $a_0 g^t (h_0 g_1^I)^u$, which is denoted by a for further reference. As indicated in the fifth line, $\mathcal{U}$ then computes $\mathcal{H}(h,a)$, which is denoted by c. The sixth line specifies $\mathcal{U}$ computing c+u mod q, which is denoted by $c_0$. As described by the seventh line, $\mathcal{U}$ then transfers $c_0$ to the CA.

Box 63 first shows the CA computing $c_0(x_0+yI)+w_0$ mod q, which is denoted by $r_0$ for further reference. As described by the second line, the CA then transfers $r_0$ to $\mathcal{U}$.

Box 64 first show $\mathcal{U}$ verifying whether $g^{r_0}(h_0 g_1^I)^{-c_0}$ is equal to $a_0$. As described by the second line, if this is the case then $\mathcal{U}$, computes $r_0+cx+t$ mod q, which is denoted by r.

As can be easily by verified by those of ordinary skill in the art, the pair (c,r) is a secret-key certificate on the public key h of $\mathcal{U}$, such that $\mathcal{U}$ knows a secret key corresponding to h. Although $\mathcal{U}$ has perfectly blinded h and (c,r), it is unfeasible for him to completely blind the secret key. That is, the secret key of $\mathcal{U}$ is a pair (x,I') such that $g^x g_1^{I'}$ is equal to h, and if (c,r) is to be a secret-key certificate on h than I' is equal modulo q to the number I that the CA in Box 63 encoded into its response r.

1.7. Certificate Issuing Protocols With More Than One Receiving Party

As will be appreciated, the protocol displayed in FIG. 6 can also be used by the CA to issue the secret-key certificate to $\mathcal{U}$ and an additional party $\mathcal{T}$ that is substantially under control of the CA, such that: $\mathcal{U}$ will get to know the public key and the secret-key certificate on the public key; and the secret key corresponding to the public key is shared between $\mathcal{U}$ and $\mathcal{T}$ in such a way that neither of $\mathcal{U}$ and $\mathcal{T}$ can determine it. To this end, the CA initially makes I known to $\mathcal{T}$ but not to $\mathcal{U}$; the CA only informs $\mathcal{U}$ of $g_1^I$. The protocol displayed in FIG. 6 remains exactly the same, but now $\mathcal{U}$ in a succeeding certificate showing protocol can only compute signatures, or prove knowledge of the secret key, when $\mathcal{T}$ cooperates: $\mathcal{T}$ knows I, and $\mathcal{U}$ knows x, and the certified public key is equal to $g^x g_1^I$. As will be appreciated, $\mathcal{T}$ does not need to participate in the secret-key certificate issuing protocol due to the initial set-up in which the CA only makes I known to $\mathcal{T}$. In patent application Ser. No. 08/203, 231, techniques are detailed and claimed for $\mathcal{T}$ and $\mathcal{U}$ to conduct a succeeding certificate showing protocol such that: I can be computed when $\mathcal{T}$ and $\mathcal{U}$ perform the showing protocol at least twice in response to different challenges; or I can never be computed, no matter how often $\mathcal{U}$ and $\mathcal{T}$ perform the showing protocol.

Other variations of the issuing protocol, for the case the certificate is issued to $\mathcal{U}$ and $\mathcal{T}$ in the manner described in the preceding paragraph, will be obvious to those of ordinary skill in the art. One such variation is that $g_1$ is taken equal to g in FIG. 6 (and correspondingly y equals 1): in that case, $\mathcal{T}$ at the end of the issuing protocol knows I, and $\mathcal{U}$ knows x, and the certified public key is equal to $G^{x+I}$. As will be appreciated, the resulting issuing protocol in effect is that described by FIG. 5, where the role of the CA is now played by the CA and $\mathcal{T}$ together. Instead of using secret key $x_0$, their secret key now is equal to $x_0+I$ mod q.

2. Second Exemplary Secret-Key Certificate

Each of the exemplary flowcharts that has been described thus far demonstrates a specific type of issuing protocol. The secret-key certificate that is issued is the same in all the flowcharts.

As described earlier, the general construction technique can be applied to any other signature scheme of the Fiat/Shamir type as well. Although it is believed that the detailed descriptions provided thus far will enable those of ordinary skill in the art to straightforwardly apply the general construction technique to other Fiat/Shamir type signatures, the general construction technique will not be applied to several other Fiat/Shamir type signatures for illustrative purposes. No issuing protocols will be described for these certificates, since it is believed to be an easy matter for those of ordinary skill in the art to apply the inventive techniques of FIGS. 2 to 6 to suit the new certificates (except for one particular certificate, that does not seem to allow blinded issuing; this will be indicated in the description of that particular certificate).

A second exemplary secret-key certificate in the first preferred embodiment, constructed by applying the general construction technique to the Okamoto signature scheme (See, Okamoto, T., Section 6.1. in "Provably Secure and Practical Identification Schemes and Corresponding Signature Schemes," Crypto'92, Lecture Notes in Computer Science 740, Springer-Verlag (1993), pp 31–53), will now be described.

Key generation means of the KAC: The secret key of the CA is a pair $(x_1, x_2)$ in $\mathbb{Z}_q \times \mathbb{Z}_q$, and the corresponding public key is $(g_1, g_2, h_0)$ in $G_q \times G_q$, where $g_1$ and $g_2$ are generators of $G_q$, and $h_0$ denotes $g_1^{x_1} g_2^{x_2}$. Preferably, $x_1$ and $x_2$ are chosen uniformly t random in $\mathbb{Z}_q$, and $g_1$ and $g_2$ are chosen uniformly at random from $G_q \backslash \{1\}$.

The tuple $(g_1, g_2, h_0)$ and the description of $G_q$ are made publicly known by the CA. The CA also makes publicly known a hash-function $\mathcal{H}$, which maps its arguments to, say $\mathbb{Z}_{2^t}$, for some appropriate security parameter t. This function should meet the requirements that are believed to make the Okamoto signature scheme secure. Preferably, $\mathcal{H}$ is collision-free.

Certificate verification means: A secret-key certificate on a public key h in $G_q$ of $\mathcal{U}$ is a triple $(c, r_1, r_2)$ in $\mathbb{Z}_{2^t} \times \mathbb{Z}_q \times \mathbb{Z}_q$ such that c is equal to $\mathcal{H}(h, g_1^{r_1} g_2^{r_2} (h_0 h)^{-c}, I)$. Alternatively, the secret-key certificate can be taken to be a triple $(a, r_1, r_2)$ in $G_q \times \mathbb{Z}_q \times \mathbb{Z}_q$. In that case, the triple is a secret-key certificate on h if $g_1^{r_1} g_2^{r_2} (h_0 h)^{-c}$ is equal to a, where c is computed as $\mathcal{H}(h, a, I)$.

The certificate is in effect an Okamoto signature of h made with a secret key that corresponds to the public key $h_0 h$.

Key generation means of $\mathcal{U}$: The discussion of key pairs provided earlier with respect to the first secret-key certificate for the first preferred embodiment, applies here as well. (As will be clear to those of ordinary skill in the art, the symbols $g_1, g_2, x_1, x_2$ chosen here for convenience, do not refer to the symbols in that discussion.)

Certificate issuing means: Those of ordinary skill in the art are believed to be capable of straightforwardly applying the inventive techniques for (a) the issuing protocols of FIGS. 2 to 6, and (b) the inventive technique to issue the secret-key certificate to $\mathcal{U}$ and an additional party $\mathcal{T}$, to construct similar certificate issuing protocols for the present secret-key certificate.

Remarks: As is well-known in the art, the security of the Okamoto signature scheme is at least as high as that of the Schnorr signature scheme. (The underlying identification scheme is known to be witness hiding, whereas the Schnorr identification scheme is not). As will be obvious to those of ordinary skill in the art, a further generalization is to let the CA use a secret key $x_1, \ldots x_k$, and corresponding public key $h_0$ equal to $\Pi$; this however, does not further increase the security of the signature scheme.

3. Third Exemplary Secret-Key Certificate

A third exemplary secret-key certificate in the first preferred embodiment, constructed by applying the general construction technique to the Brickel/McCurley signature scheme (See, Brickell, E. and McCurley, K., *"An interactive identification scheme based on discrete logarithms and factoring,"* Journal of Cryptology, Vol. 5, no. 1 (1992), pp. 29–39), will now be described.

As is well-known in the art, the Brickell/McCurley technique can be applied to both the Schnorr and the Okamoto signature scheme. This technique consists of making sure that the order q of the group $G_q$ remains unknown to $\mathcal{U}$; instead, computations that are performed modulo q in the Schnorr or Okamoto scheme are replaced by computations of a large multiple of q. To this end, it will be assumed in the description that $G_q$ is the unique subgroup of order q of $\mathbb{Z}_p^*$, where, p is a prime such that q divides p-1, and p-1 also contains another prime factor of size comparable to the size of a q (such as to prevent efficient factorization of p-1). Only the CA may know q, to speed up computations for its internal use. For explicitness, the application to the Schnorr signature scheme will be assumed.

Key generation means of the KAC: This is the same as for the first secret-key certificate, only this time $G_q$ is of the specific form described above, and q is not made publicly known. In case not even the CA knows q, $x_0$ is chosen at random from $\mathbb{Z}_{p-1}$.

Certificate verification means: A secret-key certificate on a public key h in $G_q$ of $\mathcal{U}$ is a pair $(c, r)$ in $\mathbb{Z}_{2^t} \times \mathbb{Z}_{p-1}$ such that c is equal to $\mathcal{H}(h, g^r (h_0 h)^{-c}, I)$.

As with the first secret-key certificate, alternatively a pair $(a, r)$ in $G_q \times \mathbb{Z}_{p-1}$ can be taken to be the certificate.

Key generation means of $\mathcal{U}$: The discussion of key pairs provided earlier with respect to the first secret-key certificate for the first preferred embodiment, applies here as well, with the difference that the secret key (or: each of the numbers in the secret key, for the general form) of $\mathcal{U}$ is chosen in $\mathbb{Z}_{p-1}$.

Certificate issuing means: Again, it is an easy matter to apply the inventive techniques for (a) the issuing protocols of FIGS. 2 to 6, and (b) the inventive technique to issue the secret-key certificate to $\mathcal{U}$ and an additional party $\mathcal{T}$, to construct similar certificate issuing protocols for the present secret-key certificate. Hereto, all operations that are performed modulo q must be replaced by operations modulo p-1 (if the CA knows q, it can of course still compute $g^w$, for w in $\mathbb{Z}_{p-1}$, by computing $g^{w \bmod q}$).

Remarks: As is well-known in the art, the security of the Brickell/McCurley signature scheme is at least as high as that of the Schnorr signature scheme, since as with the Okamoto scheme the underlying identification scheme is known to be witness hiding.

4. Fourth Exemplary Secret-Key Certificate

A fourth exemplary secret-key certificate in the first preferred embodiment, constructed by applying the general construction technique to the DSA (See, NIST, *"Specifications for a digital signature standard (DSS),"* Federal Information Processing Standards Pub. (draft), Aug. 19, 1991), will now be described.

Key generation means of the KAC: The secret key of the CA is a number $x_0$ in $\mathbb{Z}_q$, and the corresponding public key is $(g, h_0)$ in $G_q \times G_q$, where g is a generator of $G_q$ and $h_0$ denotes $g^{x_0}$.

The pair $(g, h_0)$ and the description of $G_q$ are made publicly known by the CA. The CA also makes publicly known a hash-function $\mathcal{H}$, which maps its arguments to, say, $\mathbb{Z}_{2^t}$, for some appropriate security parameter t. This function should meet the requirements that are believed to make the DSA secure.

Certificate verification means: A secret-key certificate on a public key h in $G_q$ of $\mathcal{U}$ is a pair (a,r) in $\mathbb{Z}_q \times \mathbb{Z}_q$ such that $((G^{cr^{-1}}(h_0 h)^{ar^{-1}}) \bmod q)$ is equal to a, where c denotes $\mathcal{H}(h,I)$.

Key generation means of $\mathcal{U}$: The discussion of key pairs provided earlier with respect to the first secret-key certificate for the first preferred embodiment, applies here as well.

Certificate issuing means: Those of ordinary skill in the art are believed to be capable of straightforwardly modifying the issuing protocol of FIG. 2 to construct a similar certificate issuing protocol for the present secret-key certificate. It is important to note that for this particular realization, contrary to the other secret-key certificates systems described in this application, it is unclear how to construct issuing protocols similar to the issuing protocols of FIGS. 3 to 6.

5. Fifth Exemplary Secret-Key Certificate

It will now be demonstrated that certain variations of the general construction technique can be used as well. A fifth exemplary secret-key certificate in the first preferred embodiment, constructed by applying a variation of the general construction technique to the Schnorr signature scheme, will now be described in detail.

Key generation means of the KAC: This is the same as in the description of the first secret-key certificate.

Certificate verification means: A secret-key certificate on a public key h in $G_q$ of $\mathcal{U}$ will now be taken to be a pair (c,r) in $\mathbb{Z}_{2^t} \times \mathbb{Z}_q$ such that c is equal to $\mathcal{H}(h, g^r h^{-c}, I)$.

The secret-key certificate can alternatively be taken to be a pair (a,r) in $G_q \times \mathbb{Z}_q$ such that $g^r h^{-c}$ is equal to a, where c is computed as $\mathcal{H}(h,a,I)$.

It seems that this secret-key certificate has not been constructed from the Schnorr identification scheme by applying the general construction technique: the public key $h_0$ seems to have "disappeared" from the verification relation. However, it now has to show up in the definition of the type of key pair used by $\mathcal{U}$. In other words, merely a slight variation of the general construction technique has been applied.

Key generation means of $\mathcal{U}$: In general, for the modified secret-key certificate to be secure, the public key of $\mathcal{U}$ must be defined as a product $g_1^{x_1} \ldots g_k^{x_k} h_0^{x_{k+1}}$, where none of the randomly chosen elements, $g_i$ is equal to g (or a publicly known power thereof). As with the first secret-key certificate, $g_1, \ldots, g_k$ are randomly chosen generators of $G_q$ that are published by the CA in addition to g, $h_0$, and the descriptions of $G_q$ and $\mathcal{H}$.

In practice, one may want to use a simpler form of key pair. The simplest form is one in which the secret key of $\mathcal{U}$ is a number x in $G_q$, and the public key h is equal to $)h_0^x$, and h may not be equal to 1. Another simple form is one in which the secret key of $\mathcal{U}$ is a pair $(x_1, x_2)$, such that h is equal to $g_1^{x_1} h_0^{x_1}$.

To demonstrate that all the issuing techniques provided for the first secret-key certificate in the first preferred embodiment can be straightforward applied to construct issuing protocols for the modified secret-key certificate, the most difficult to realize type of issuing protocol for the modified secret-key certificate will now be described.

Figure 7:
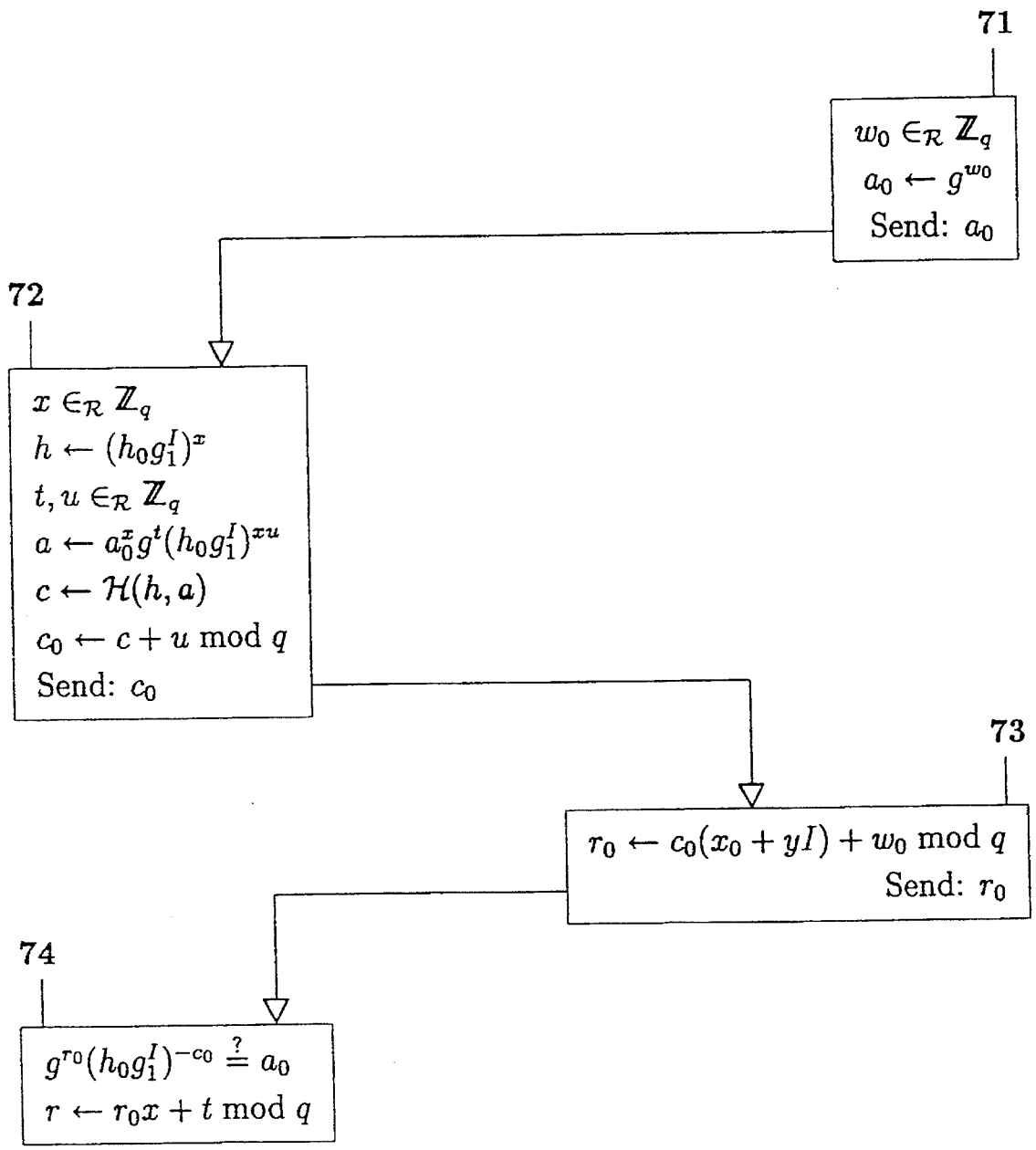
FIG. 7 shows a second flowchart of a restrictive blind secret-key certificate issuing protocol for the first preferred embodiment in accordance with the teachings of the present invention.

Turning now to FIG. 7, a second flowchart of a restrictive blinded secret-key certificate issuing protocol for the first preferred embodiment will not be described in detail.

The secret key of $\mathcal{U}$ is a pair (x,I) in $\mathbb{Z}_q \times \mathbb{Z}_q$, and the public key h is equal to $g_z^x h_0^I$. As in the previous flowchart, the CA has generated $g_1$ by generating at random a (secret) number y in $\mathbb{Z}_q$, and setting $g_1$ equal to $g^y$. The blinding that can be performed by $\mathcal{U}$ in the protocol differs from that in the preceding protocol, but the restrictivity property still holds: the number that the CA will encode into the secret key (x,I) of $\mathcal{U}$ is equal to I/x mod q.

As in the preceding flowchart, at the start of the issuing protocol the CA decides on a number I in $\mathbb{Z}_q$ that will be encoded into the secret key of $\mathcal{U}$ when the issuing protocol is performed.

Box 71 first shows the CA generating at random a number $w_0$ in $\mathbb{Z}_q$. The second line shows the CA computing $g^{w_0}$, which is denoted by $a_0$ for further reference. As described by the third line, it then transfers $a_0$ to $\mathcal{U}$.

Box 72 first shows $\mathcal{U}$ generating a number x in $\mathbb{Z}hd q$; the pair (x,Ix mod q) will be his secret key. The second line shows $\mathcal{U}$ computing the corresponding public key h, by setting it equal to $(h_0 g_1^I)^x$. In addition, as specified by the third line, $\mathcal{U}$ generates two random numbers t, u in $\mathbb{Z}_q$, which will serve to obtain blinded r and c the fourth line shows $\mathcal{U}$ computing $a_0^x g^t (h_0 g_1^I)^{xu}$, which is denoted by a. The fifth line shows $\mathcal{U}$ computing $\mathcal{H}(h,a)$, which is denoted by c. The sixth line shows $\mathcal{U}$ computing c+u mod q, which is denoted by $c_0$. As described by the seventh line, $\mathcal{U}$ then transfers $c_0$ to the CA.

Box 73 first shows the CA computing $c_0(x_0+yI)+w_0$ mod q, which is denoted by $r_0$ for further reference. As described by the second line, the CA then transfers $r_0$ to $\mathcal{U}$.

Box 74 first shows $\mathcal{U}$ verifying whether $g^{r_0}(h_0 g_1^I)^{-c_0}$ is equal to $a_0$. As described by the second line, if this is the case than $\mathcal{U}$ computes $r_0 x + t$ mod q, which is denoted by r.

As can easily be verified by those of ordinary skill in the art, the pair (c,r) is a secret-key certificate on the public key h of $\mathcal{U}$, such that $\mathcal{U}$ knows a secret key corresponding to h. The following holds: the secret key of $\mathcal{U}$ is a pair (x,I') such that $h_0^x g_1^r$ is equal to h, and if (c,r) is to be a secret-key certificate on h then I'/x mod q is equal modulo q to the number I that the CA in Box 73 encoded into its response r.

Remark: As will be appreciated, the security of the systems constructed using the general construction technique is closer related to the security of the underlying Fiat/Shamir signature scheme, and in that sense the previous secret-key certificates are preferable.

SECOND PREFERRED EMBODIMENT

In the second preferred embodiment computations are performed in a multiplicative group modulo n, denoted by $\mathbb{Z}_n^*$, with n being the product of two distinct large primes. Since the order of the group may only be known to at most the certifying party, the computations in the exponents are modulo a number v that is not a proper divisor of the order of $\mathbb{Z}_n^*$. For this reason, in the blinded certificate issuing protocols that will be described, expressions involving div v will show up (recall that x is equal to x mod v+v(x div v) for x in $_1$.

Since multiplications and divisions in $\mathbb{Z}_n^*$ are always performed module n, the operator mod n will never be mentioned explicitly. So for example $w^v$ stands for $w^v$ mod n. In case other modulo operations are involved, the modulo operator is explicitly mentioned (as in, for example, $c_0$=c+u mod v). If numbers are chosen from a group or ring, always the smallest positive remainder is implied. For instance, $w \in_R \mathbb{Z}_n^*$ implies that $w$ is chosen at random from the subset $\{1, \ldots, n-1\}$ containing the numbers co-prime with n (in practice, this set can be taken to be $\{1, \ldots n-1\}$).

As will be obvious to those of ordinary skill in the art, one can take v to be either composite or prime. Suitable choices for v are to take v such that either $\gcd(v,\phi(n))$ is equal to 1 or $\gcd(v,\phi(n))$ is equal to 2. As will be clear to those of ordinary skill in the art, the former choice makes various attacks on the systems as hard as breaking RSA (See, R. Rivest, A. Shamir, and L. Adleman, "*A method for obtaining digital signatures and public-key cryptosystems,*" Communications of the ACM, Feb. 1978, pp. 120–126), the latter choice makes these attacks as hard as factoring. Here, $\phi$ is the Euler-phi function, well-known in the art, that denotes the number of elements in $\mathbb{Z}_n^*$.

The exemplary secret-key certificates will, as in the first preferred embodiment, all be constructed from Fiat/Shamir signature schemes by applying the general construction technique. The structure of the exposition is similar to the exposition in the first preferred embodiment: a detailed description of one particular system is presented first, together with a variety of issuing protocols, followed by a description of how the general construction technique can be applied to other Fiat/Shamir type schemes.

1. First Exemplary Secret-Key Certificate

A first exemplary secret-key certificate in the second preferred embodiment, constructed by applying the general construction technique to the Guillou/Quisquater signature scheme (See, Guillou, L. and Quisquater, J., "*A practical zero-knowledge protocol fitted to security microprocessor minimizing both transmission and memory,*" Lecture Notes in Computer Science 330, Proceedings of Eurocrypt '88, Springer-Verlag (1989), pp. 123–128), will now be described in detail.

Key generation means of the KAC: Let v be an element in $\mathbb{Z}_n^*$. A convenient choice for v is to take v a prime that is co-prime to $\phi(n)$. However, as mentioned, other choices of v can be used as well, such as v equal to 2p for a prime number p that is co-prime to $\phi(n)$.

The secret key of the CA is a number $x_0$ in $\mathbb{Z}_n^*$, and its corresponding public key $h_0$ is equal to $x_0^v$. Preferably, $x_0$ is chosen uniformly ar random in $\mathbb{Z}_n^*$.

The triple $(n,v,h_0)$ is made publicly known by the CA. In addition, a hash-function $\mathcal{H}$ is made publicly known, which maps its arguments to, say, $\mathbb{Z}_{2^t}$, for some appropriate security parameter t. This function should meet the requirements that are believed to make the Guillou/Quisquater signature scheme secure, and is preferably collision-free.

Certificate verification means: A secret-key certificate on a public key h in $\mathbb{Z}_n^*$ of $\mathcal{U}$ is a pair (c,r) in $\mathbb{Z}_{2^t} \times \mathbb{Z}_n^*$ such that c is equal to $\mathcal{H}(h,r^v(h_0h)^{-c},I)$. The number I is as described in the first preferred embodiment, and as before its incorporation is not strictly necessary.

The secret-key certificate can alternatively be taken to be a pair (a,r) in $\mathbb{Z}_n^* \times \mathbb{Z}_n^*$. In that case, the pair is a secret-key certificate on h if $r^v(h_0h)^{-c}$ is equal to a, where c is computed as $\mathcal{H}(h,a,I)$.

As will be clear to those of ordinary skill in the art, this secret-key certificate system has been constructed from the Guillou/Quisquater identification scheme by applying the general construction technique. That is, the certificate is in effect a Guillou-Quisquater signature on h made with secret key $(h_0h)^{1/v}$, corresponding to the public key $h_0h$.

Key generation means of $\mathcal{U}$: In a general form, the secret key of $\mathcal{U}$ can be taken to be a tuple $(z_1, \ldots z_k; x)$, where each $z_i$ is in $\mathbb{Z}_v$, x is in $\mathbb{Z}_n^*$, and h is equal to $(\prod_{i=1}^k g_i^{z_i})x^{v_1}$. (As will be clear to those of ordinary skill in the art, the more general form, $(z_1, \ldots, z_k, x_1, \ldots x_l)$, can be considered, such that h is equal to $\prod_{i=1}^k g_i^{z_i} \prod_{i=1}^l x_i^{v_i}$ for appropriate exponents $v_i$. It is believed to be straightforward for those of ordinary skill in the art to apply the disclosed inventive techniques to this more general form.) Here, $g_1, \ldots, g_k$ are randomly chosen numbers in $\mathbb{Z}_n^*$, preferably of large order (which can easily be taken care of by taking the prime divisors p and q of n such that p-1 and q-1 both have a large prime divisor). All these numbers are made publicly available by the CA, in addition to $n,v,h_0$ and the description of $\mathcal{H}$. As will be appreciated, any integer $v_1$ can be used for the key pair of $\mathcal{U}$. From now on, for concreteness $v_1$ will always be taken equal to v.

For each $g_i$ ($1 \le i \le k$), the CA should preferably know $g_i^{1/v}$, in order to be able to conduct the issuing protocol: the secret key of the CA that corresponds to the public key $h_0h$ is the v-th root of this number, which is equal to $x_0 x \prod_{i=1}^k (g_i^{1/v})^{z_i}$.

In practice, one may want to use a simpler form. The simplest form is one in which the secret key of $\mathcal{U}$ is a number x in $\mathbb{Z}_n^*$, and the public key h is equal to $x^v$. Another simple form is one in which the secret key of $\mathcal{U}$ is a pair $(x_1;x_2)$ in $\mathbb{Z}_v \times \mathbb{Z}_n^*$, such that has is equal to $g_1^{x_1}x_2^v$. Both forms allow $\mathcal{U}$ to, for instance, compute signatures and prove knowledge of his secret key. (As is well-known, for a key pair of the form $g_1^{z_1}g_2^{x_2}$ no secure protocols for these tasks are known in the art.) As will be demonstrated in the flowchart of FIG. 12, this second form is of particular importance for the construction of restrictive blind signature protocols.

Certificate simulating means: Those of ordinary skill in the art may wish to verify that anyone can feasibly generate pairs h,(c,r) such that the verification relation holds, by taking h equal to $h_0^{-1}s^v$ for an arbitrary s in $\mathbb{Z}_n^*$, and a equal to $t^v$ for an arbitrary t in $\mathbb{Z}_n^*$; the pair $(c,s^ct)$, with c equal to $\mathcal{H}(h,a,I)$, then is a secret-key certificate on h. However, the ability to feasibly generate such pairs together with a secret key, that corresponds to the public key h according to one of the key schemes described in the preceding three paragraphs, enables one to forge Guillou/Quisquater signatures.

1.1. Examples for the First Exemplary Secret-Key Certificate

Before providing exemplary embodiments for various certificate issuing protocols, a few examples are provided that will help those of ordinary skill in the art to appreciate how the described secret-key certificate may be used in practice.

EXAMPLE 1

In this example, it will be assumed that the secret key of $\mathcal{U}$ is a number x in $\mathbb{Z}_v$, and the corresponding public key h is equal to $g^x$. Here, g is a randomly chosen number in $\mathbb{Z}_n^*$, preferably of large order, which has been made publicly available by the CA. Suppose that user $\mathcal{U}_1$ wants to transfer an encrypted message m in $\mathbb{Z}_n^*$ to $\mathcal{U}_2$. The encryption scheme which is used is the ElGamal scheme in the group $\mathbb{Z}_n^*$. From the public-key directory, $\mathcal{U}_1$ retrieves the public key $h_2$ of $\mathcal{U}_2$, and the string $(c_2,r_2)$. If $c_2$ is equal to $\mathcal{H}(h_{2,rx}^v(h_0h_2)^{-2},I_2)$, then $\mathcal{U}_2$ can safely transfer the encrypted message to $\mathcal{U}_2$. Hereto, he generates at random a number s, and transfers the pair $(g^sh_2^sm)$ to $\mathcal{U}_2$. If $\mathcal{U}_2$ can decrypt and retrieve m, then he must know $\log_g h_2$ (as is well-known in the art, this holds under the factoring assumption, and for randomly chosen m). This in turn implies that he could not have generated $(h_2,(c_2,r_2))$ by himself.

EXAMPLE 2

In this example, it will be assumed that the secret key of $\mathcal{U}$ is a number x in $\mathbb{Z}_n^*$, and the corresponding public key h is equal to $x^v$. Suppose that $\mathcal{U}_2$ digitally signs a message m for $\mathcal{U}_1$, using the Guillou/Quisquater signature scheme. $\mathcal{U}_1$ receives from $\mathcal{U}_2$ a pair (c,r) such that c is equal to $\mathcal{H}(m,r^vh_2^{-c})$. If the public key $h_2$ of $\mathcal{U}_2$ is listed in the public-key directory together with a pair $(c_2,r_2)$ for which $c_2$ is equal to $\mathcal{H}(h_2,r_2^v(h_0h_2)^{-c_2},I_2)$, then the fact that $\mathcal{U}_2$ can compute this signature also informs $\mathcal{U}_1$ that the key pair of $\mathcal{U}_2$ has been certified by the CA. These two facts can also be verified by anyone else, and so the signature can have legal significance.

1.2. First Exemplary Certificate Issuing Protocol

A variety of protocols for issuing the described secret-key certificate, similar to those described in the first preferred embodiment, will now be described. For explicitness it will be assumed in each of these flowcharts that the secret key of $\mathcal{U}$ is of the simplest form; it is a number x in $\mathbb{Z}_n^*$ such that the corresponding public key h is equal to $x^v$. Those of ordinary skill are believed to be able to straightforwardly apply the inventive techniques to suit the other types of key pairs for $\mathcal{U}$.

Figure 8:
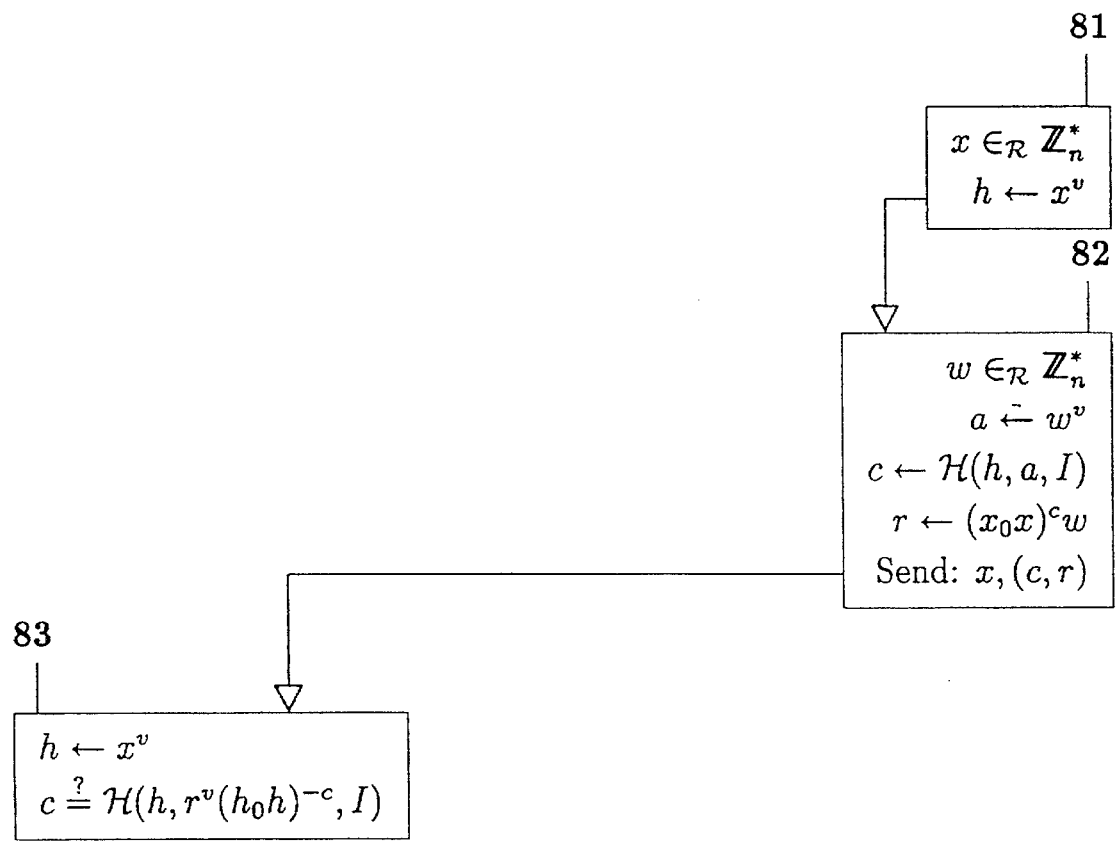
FIG. 8 shows a flowchart of a secret-key certificate issuing protocol for a second preferred embodiment in accordance with the teachings of the present invention.

Turning now to FIG. 8, the first flowchart of a secret-key certificate issuing protocol for the second preferred embodiment will now be described in detail. As will be clear to those of ordinary skill in the art, this issuing protocol has the same functionality as the protocol of FIG. 2.

Box 81 first shows the CA generating a secret key x in $\mathbb{Z}_n^*$ for use by $\mathcal{U}$. As indicated in the second line, the corresponding public key h of $\mathcal{U}$ is taken equal to $x^v$.

Box 82 first shows the CA generating at random a number w in $\mathbb{Z}_n^*$. The second line shows the CA computing $w^v$, which is denoted by a for further reference. The third and fourth lines show the CA computing $\mathcal{H}(h,a,I)$, which is denoted by c, and $(x_0x)^cw$, which is denoted by r. The CA then transfers the secret key x and the pair (c,r) to $\mathcal{U}$ as described by the fifth line.

Box 83 first shows $\mathcal{U}$ computing his public key h, by setting it equal to $x^v$. The second line indicates that $\mathcal{U}$ verifies if c is equal to the hash-value of the triple $(h,r^v(h_0h)^{-c},I)$.

If the equality holds, the pair (c,r) is a secret-key certificate on the public key h of $\mathcal{U}$, such that $\mathcal{U}$ knows the secret key corresponding to h.

As will be clear to those of ordinary skill in the art, if the CA knows the prime factorization of n, then in Box 82 it can simply take any number a in $\mathbb{Z}_n^*$. Of course, since v-th roots are involved, the CA must generate this number from the set of all v-th powers in $\mathbb{Z}_n^*$; if v is co-prime to $\phi(n)$ then this set is equal to $\mathbb{Z}_n^*$; if, for example, v is twice a number that is co-prime to $\phi(n)$, then v-th roots modulo n exist only for the quadratic residues in $\mathbb{Z}_n^*$.

1.3. Second Exemplary Certificate Issuing Protocol

As in the first preferred embodiment, the need for the CA to know the secret of key of $\mathcal{U}$ can be removed by letting $\mathcal{U}$ perform part of the computations.

Figure 9:
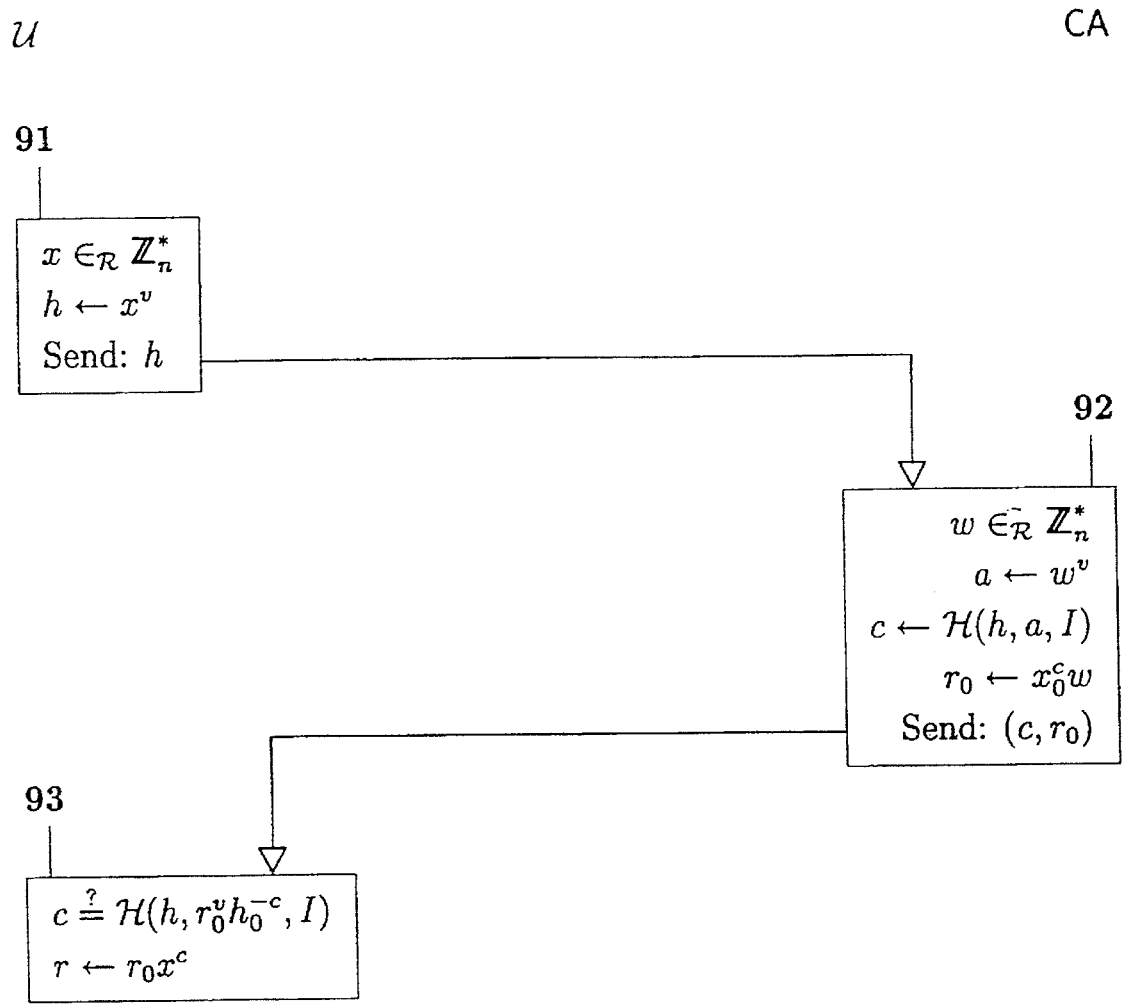
FIG. 9 shows a flowchart of a secret-key certificate issuing protocol, such that the Certification Authority does not need to known the secret key of the recipient, for the second preferred embodiment in accordance with the teachings of the present invention.

Turning now to FIG. 9, a flowchart of a secret-key issuing protocol that hides the secret key of $\mathcal{U}$ from the CA, in the second preferred embodiment, will now be described in detail. As will be clear to those of ordinary skill in the art, this issuing protocol has the same functionality as the protocol of FIG. 3.

Box 91 first shows $\mathcal{U}$ generating at random a number x in $\mathbb{Z}_n^*$; this will be his secret key. The second line shows $\mathcal{U}$ computing the corresponding public key h by setting it equal to $x^v$. $\mathcal{U}$ then transfers h to the CA, as indicated by the third line.

Box 92 first shows the CA generating at random a number w in $\mathbb{Z}_n^*$. The second line shows the CA computing $w^v$, which is denoted by a for further reference. The third and fourth lines show the CA computing $\mathcal{H}(h,a,I)$, which is denoted by c, and $x_0^cw$, which is denoted by $r_0$. The fifth line indicates that the CA transfers the pair $(c,r_0)$ to $\mathcal{U}$.

Box 93 first shows $\mathcal{U}$ verifying whether c is equal to the hash-value of the triple $(h,f_0^vh_0^{-c},I)$. As described by the second line, if this is the case then $\mathcal{U}$ computes $r_0x^c$, which is denoted by r.

As can easily be verified by those of ordinary skill in the art, the pair (c,r) is a secret-key certificate on the public key h, such that $\mathcal{U}$ knows the secret key corresponding to h.

1.4. Hiding the Secret Key From the CA

Contrary to the first preferred embodiment, the RSA function has a trapdoor (i.e., the prime factorization of n). If the CA knows this prime factorization, it can always compute the secret key, even if $\mathcal{U}$ tries to hide it by using the issuing protocol of FIG. 9. Nevertheless, it can still make sense for $\mathcal{U}$ to hide the secret key from the CA, namely, in the case multiple secret keys correspond to the same public key and $\mathcal{U}$ can know only one (or a small fraction of all corresponding secret keys). The following example may help to appreciate this.

Consider a situation where the secret key of $\mathcal{U}$ is a tuple $(x_1,x_2;I_1,I_2)$ in $\mathbb{Z}_n^* \times \mathbb{Z}_n^* \times \mathbb{Z}_v \times \mathbb{Z}_v$, such that $h_1$ is equal to $g_1^{I_1}x_1^v$ and $h_2$ is equal to $g_1^{I_2}x_2$, where $(h_1,h_2)$ is his public key. As is well-known in the art, this public key can be used to make a one-time signature. The signature of $\mathcal{U}$ on a message m in $\mathbb{Z}_v$ is the pair $(I_1m+I_2 \mod v, g_1^{I_1m+I_2div}vx_1^mx_2)$. A straightforward modification of the preceding certificate issuing protocol gets $\mathcal{U}$ a secret-key certificate on his public key $(h_1,h_2)$. (The certificate is a pair (c,r) such that c is equal to $(h_1,h_2,r^v(h_0h_1)^{-c},I)$, for instance.) Of course, as will be clear to those of ordinary skill in the art, to prevent forgery of signatures, the number m in the verification relation for the signature now must be taken equal to a one-way hash of at least the message and the public key, instead of being the message itself. Now, even if the CA knows the prime factorization, and hence can compute all secret keys corresponding to $(h_1,h_2)$, the probability is negligible that it can determine the particular secret key known by $\mathcal{U}$; as is well-known in the art, the signature scheme of $\mathcal{U}$ is witness-indistinguishable. This in turn implies that if the CA forges a signature of $\mathcal{U}$, using a different secret key, then the $\mathcal{U}$ can compute $g_1^{1/v}$, thereby proving the fraud of the CA.

If the CA should not have the power to compute any secret key at all, the number n must be generated such that the CA does not know the prime factors, to this end, the process of generating n should be conducted by a trusted secured device that destroys the prime factors after having generated n, or by some other trusted party.

1.5. Third Exemplary Certificate Issuing Protocol

As in the first preferred embodiment, there exist many secret-key certificates (c,r) on the same public key and so the CA may choose a particular one and encode information in it.

Figure 10:
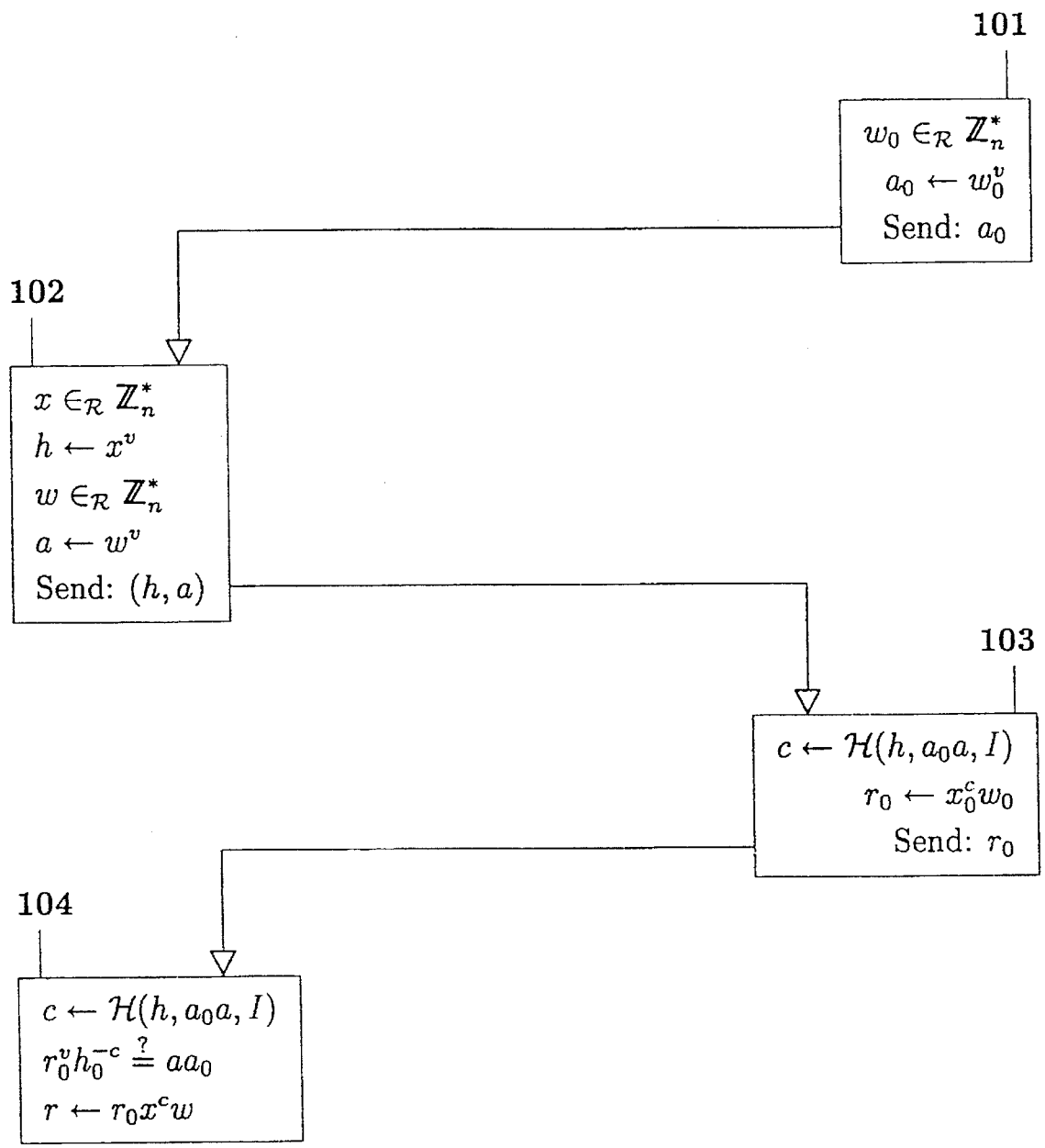
FIG. 10 shows a flowchart of a secret-key certificate issuing protocol, such that the subliminal channel in the secret-key certificate is prevented, for the second preferred embodiment in accordance with the teachings of the present invention.

Turning now to FIG. 10, a flowchart of a secret-key issuing protocol that hides the secret key from the CA and prevents the subliminal channel, in the second preferred embodiment, will now be described in detail. As will be clear to those of ordinary skill in the art, this issuing protocol has the same functionality as the protocol of FIG. 4.

Box 101 first shows the CA generating at random a number $w_0$ in $Z_n^*$. The second line shows the CA computing $w_0^v$, which is denoted by $a_0$ for further reference. The third line indicates that the CA then transfers $a_0$ to $\mathcal{U}$.

Box 102 shows first shows $\mathcal{U}$ generating at random a number x in $Z_n^*$; this will be his secret key. The second line shows $\mathcal{U}$ computing the corresponding public key h by setting it equal to $x^v$. The third line shows $\mathcal{U}$ generating at random a number w in $Z_n^*$, and the fourth line shows $\mathcal{U}$ transfers the pair (h,a) to the CA.

Box 103 first shows the CA computing $\mathcal{H}(h,a_0a,I)$, which is denoted by c for further reference. The second line shows the CA computing $x_0^c w_0$, which is denoted by $r_0$. As described by the third line, the CA then transfers $r_0$ to $\mathcal{U}$.

Box 104 first shows $\mathcal{U}$ computing c as did the CA in the first line of Box 103. The second line indicates that $\mathcal{U}$ verifies whether $aa_0$ is equal to $r_0^v h_0^{-c}$. As the third line displays, if this is the case then $\mathcal{U}$ computes $r_0 x^c w$, which is denoted by r.

As can easily be verified by those of ordinary skill in the art, the pair (c,r) is a secret-key certificate on the public key h, randomized by $\mathcal{U}$, such that $\mathcal{U}$ knows the secret key corresponding to h.

It will be obvious to those of ordinary skill that $\mathcal{U}$ in Box 102 could transfer w to the CA, instead of a. In Box 103 the CA can then compute $x_0^c w_0 w$ itself, into which $\mathcal{U}$ now has to multiply $x^c$ modulo n. This, however, causes an extra computational cost for the CA, which now has to compute one additional exponentiation in $Z_n^*$, whereas the computational cost for $\mathcal{U}$ is virtually not reduced.

1.6. First Exemplary Certificate Issuing Protocol

Figure 11:
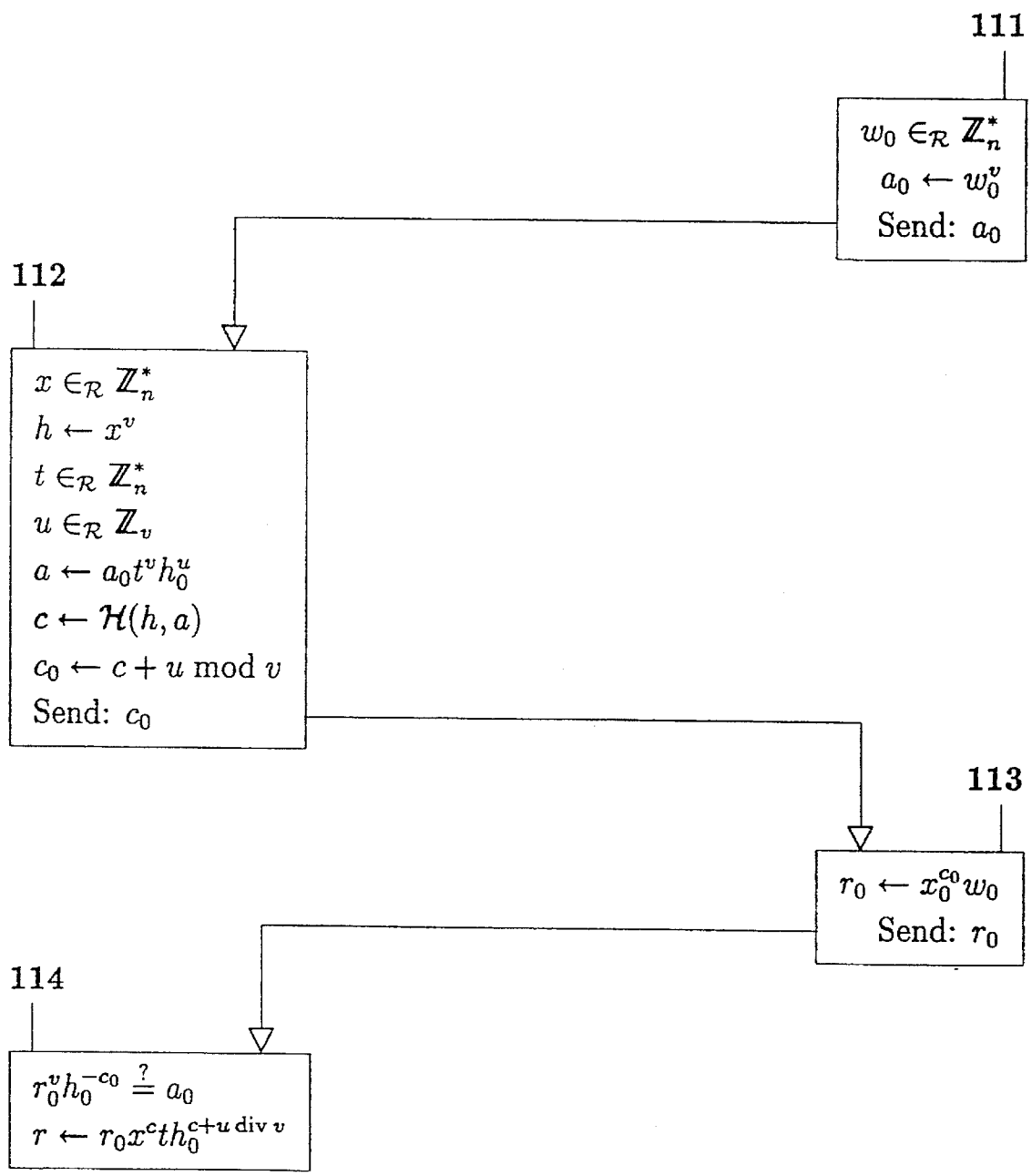
FIG. 11 shows a flowchart of a secret-key certificate issuing protocol, such that the recipient fully blinds the issued information, for the second preferred embodiment in accordance with the teachings of the present information.

Turning now to FIG. 11, a flowchart of a fully blinded secret-key issuing protocol in the second preferred embodiment will now be described in detail. As will be clear to those of ordinary skill in the art, this issuing protocol has the same functionality as the protocol of FIG. 5.

As discussed in the first preferred embodiment, for convenience the string I will henceforth be omitted.

Box 111 first shows the CA generating at random a number $w_0$ on $Z_n^*$. The second line shows the CA computing $w_0^v$, which is denoted by $a_0$ for further reference. As described by the third line, the CA then transfers $a_0$ to $\mathcal{U}$.

Box 112 first shows $\mathcal{U}$ generating at random a number x in $Z_n^*$; this will be his secret key. The second line shows $\mathcal{U}$ computing the corresponding public key h, by setting it equal to $x^v$. The third line shows $\mathcal{U}$ generating at random a number t in $Z_n^*$, and the fourth line shows $\mathcal{U}$ generating at random a number u in $Z_v$. Using these random numbers, the fifth line shows how $\mathcal{U}$ blinds $a_0$, by computing $a_0 t^v h_0^u$; this number is denoted by a for further reference. This sixth line shows $\mathcal{U}$ computing $\mathcal{H}(h,a)$, which is denoted by c, and blinding it, as described by the seventh line, to c+u mod v; this number is denoted by $c_0$ for further reference. As described by line eight, $\mathcal{U}$ then transfers $c_0$ to the CA.

Box 113 first shows the CA computing $x_0^{c_0} w_0$, which is denoted by $r_0$ for further reference. As described by the second line, the CA then transfers $r_0$ to $\mathcal{U}$.

Box 114 first shows $\mathcal{U}$ verifying whether $r_0^v h_0^{-c_0}$ is equal to $a_0$. As described by the second line, if this is the case then $\mathcal{U}$ computes $r_0 9 x^c h_0^{c+u \, div \, v}$, which is denoted by r.

As will be clear to those of ordinary skill in the art, (c,r) is a secret-key certificate on the public key h of $\mathcal{U}$. In addition, views of the CA in executions of this issuing protocol are independent from pairs (h,(c,r)).

1.7. Fifth Exemplary Certificate Issuing Protocol

Figure 12:
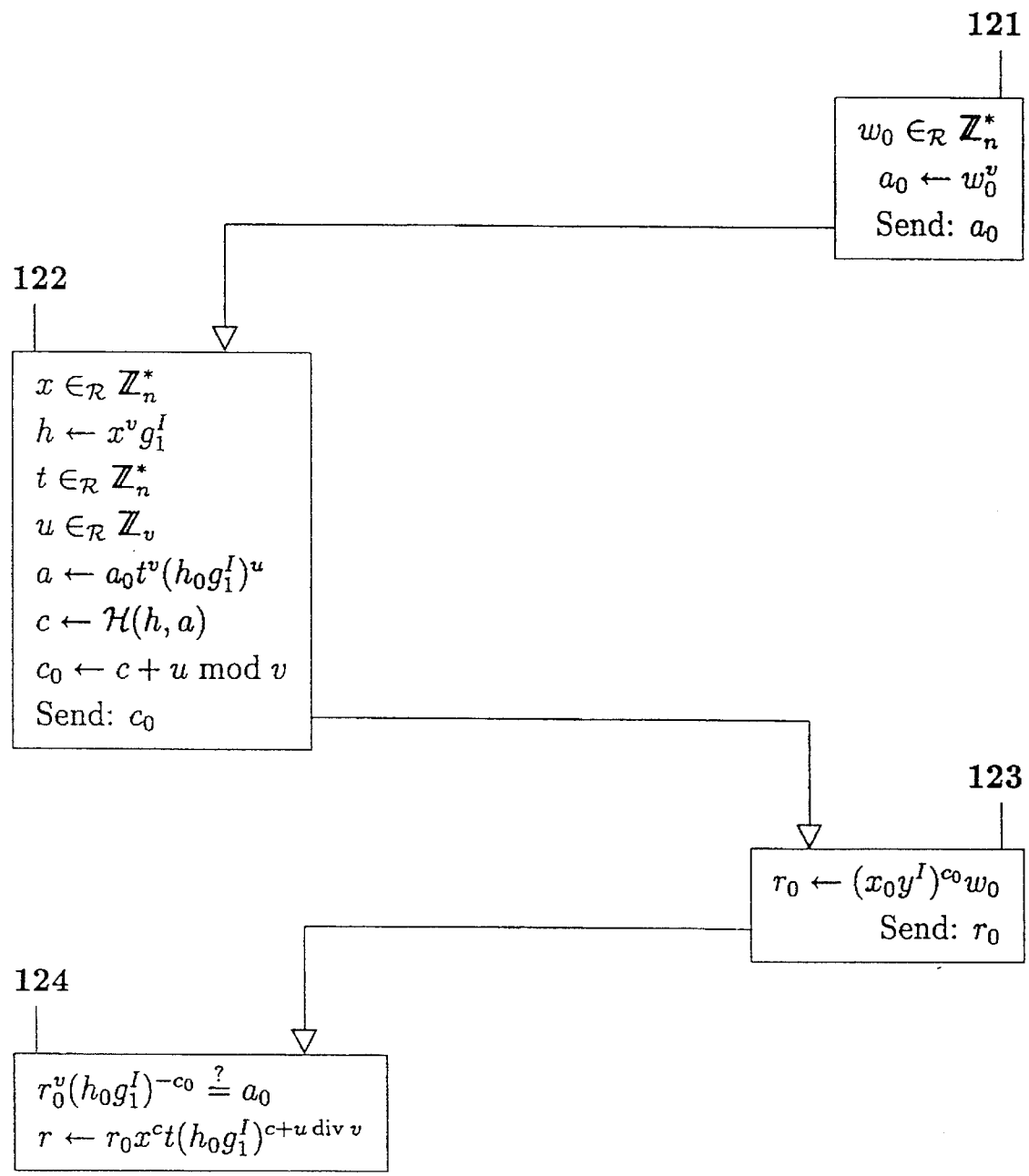
FIG. 12 shows a flowchart of a restrictive blind secret-key certificate issuing protocol for the second preferred embodiment in accordance with the teachings of the present invention.
Figure 1:
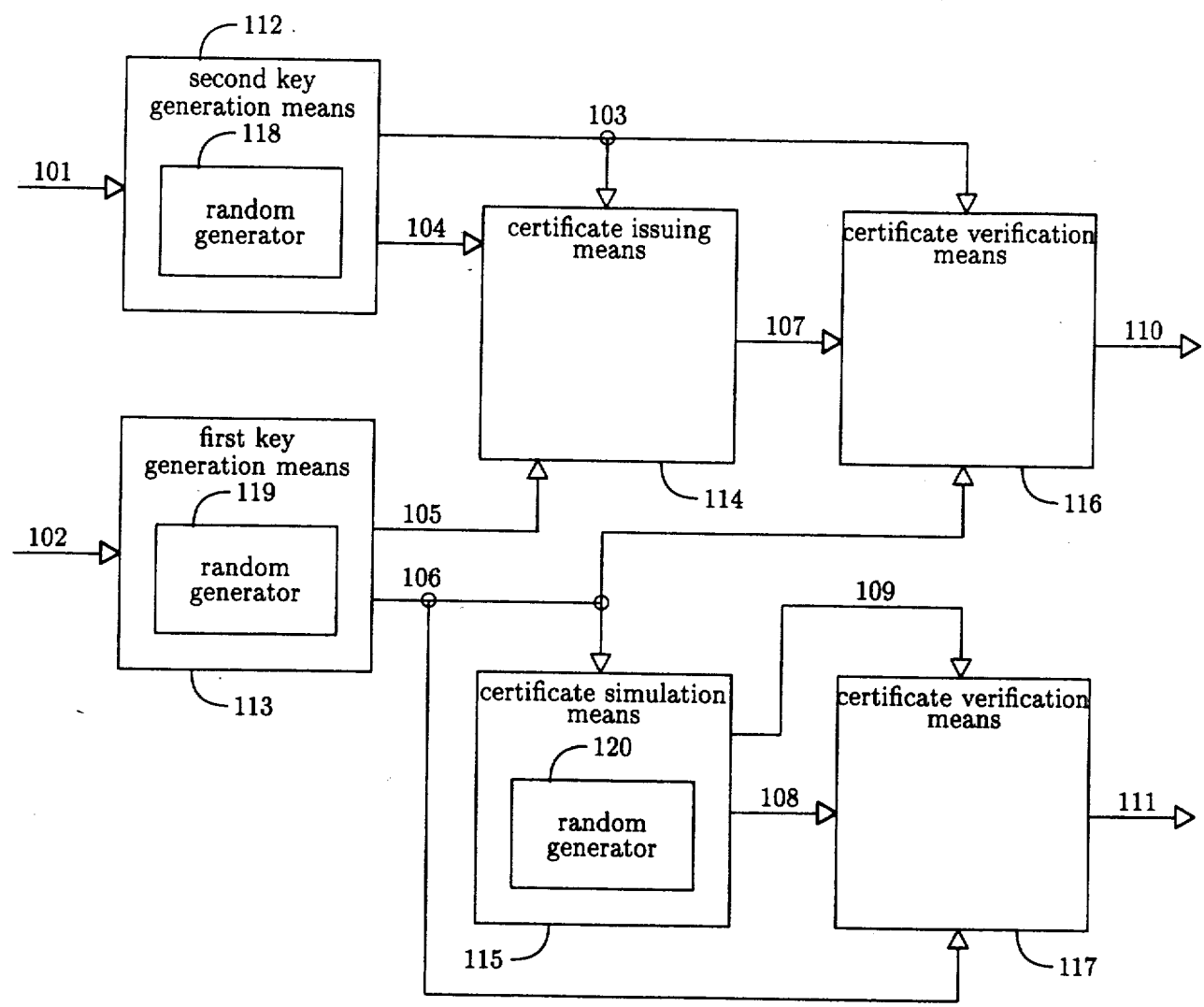

Turning now to FIG. 12, a flowchart of a restrictive blind secret-key certificate issuing protocol for the second preferred embodiment will now be described in detail. This protocol is also described and claimed in patent application Ser. No. 08/203,231, but, as will be appreciated, is included here (using the present notation) to clearly demonstrate that the protocol in effect is a restrictive blind secret-key certificate issuing protocol. As will be clear to those of ordinary skill in the art, this issuing protocol has the same functionality as the protocol of FIG. 6.

The key pair of $\mathcal{U}$ must be different from that used until now, because the secret key must be a vector of at least two numbers. For concreteness, the following choice is made: the secret key of $\mathcal{U}$ is a pair (x;I) in $Z_n^* \times Z_v$ such that $x^v g_1^I$ is equal to h. Here, the CA has generated $g_1$ by generating at random a (secret) number y in $Z_n^*$, and setting $g_1$ equal to $y^v$.

The second number of this pair, I will be encoded by the CA into the secret key of $\mathcal{U}$ during the certificate issuing protocol, in such a way that $\mathcal{U}$ will not be able to change I to a number I' that differs modulo v from I. On the other hand, $\mathcal{U}$ will be able to generate x by himself uniformly at random in $Z_n^*$, and hence h in effect is generated at random from $Z_n^*$, independently from I. As described before, the number I may be related to the identity of $\mathcal{U}$, but can as well contain unrelated information, such as a credential specification.

Box 121 first shows the CA generating at random as number $w_0$ in $Z_n^*$. The second line shows the CA computing $w_0^v$, which is denoted by $a_0$ for further reference. As described by the third line, the CA then transfers $a_0$ to $\mathcal{U}$.

Box 122 first shows $\mathcal{U}$ generating a number x in $Z_n^*$; the pair (x,I) will be his secret key. The second line shows $\mathcal{U}$ computing the corresponding public key h, by setting it equal to $x^v g_1^I$. In addition, as displayed in the third and fourth lines, $\mathcal{U}$ generates two random numbers t in $Z_n^*$ and u in $Z_v$, which will serve to obtain blinded r and c. The fifth line shows $\mathcal{U}$ computing $a_0 t^v (h_0 g_1^I)^u$, which is denoted by a for further reference. As indicated in the sixth line, $\mathcal{U}$ then computes $\mathcal{H}(h,a)$, which is denoted by c. The seventh line specifies $\mathcal{U}$ computing c+u mod v, which is denoted by $c_0$. As described by the eighth line, $\mathcal{U}$ then transfers $c_0$ to the CA.

Box 123 first shows the CA computing $(x_0 y^I)^{c_0} w_0$, which is denoted by $r_0$ for further reference. As described by the second line, the CA then transfers $r_0$ to $\mathcal{U}$.

Box 124 first shows $\mathcal{U}$ verifying whether $r_0^v (h_0 g_1^I)^{-c_0}$ is equal to $a_0$. As described by the second line, if this is the case then $\mathcal{U}$ computes $r_0 x^c t (h_0 g_1^I)^{c+u \, div \, v}$, which is denoted by r.

As can easily be verified by those of ordinary skill in the art, the pair (c,r) is a secret-key certificate on the public key h of $\mathcal{U}$, such that $\mathcal{U}$ knows the secret key corresponding to h. Although $\mathcal{U}$ has perfectly blinded h and (c,r), it is unfeasible for him to completely blind the secret key. The secret key of $\mathcal{U}$ is a pair (x;I') such that $x^v g_1^{I'}$ is equal to h, and if (c,r) is to be a secret-key certificate on h than I' is unavoidably equal modulo v to the number I that the CA in Box 123 encoded into its response r.

1.8. Certificate Issuing Protocols With More Than One Receiving Party

As in the first preferred embodiment, the protocols displayed in FIGS. 11 and 12 can also be used by the CA to issue the secret-key certificate to $\mathcal{U}$ and an additional party $\mathcal{T}$ that is substantially under control of the CA, such that: $\mathcal{U}$ will get to know the public key and the secret-key certificate on the public key; and the secret key corresponding to the public key is shared between $\mathcal{U}$ and $\mathcal{T}$ in such a way that neither of $\mathcal{U}$ and $\mathcal{T}$ can determine it.

One possible such use, based on the protocol of FIG. 11, will not be described. The secret key used that will be used for $\mathcal{U}$ by the CA now is $Ix_0$ (the public key still is $x_0^v$), where I is known by $\mathcal{T}$ but not by $\mathcal{U}$; $\mathcal{U}$ only knows $I^v$. The issuing protocol between the CA and $\mathcal{U}$ as described by FIG. 11 now takes place, where the CA now computes in the first line of Box 113 the number $r_0$ as $(x_0I)^{c_0}w_0$. As will be clear to those of ordinary skill in the art, $\mathcal{T}$ at the end of the issuing protocol knows I, and $\mathcal{U}$ knows x, and the certified public key is equal to $(Ix)^v$. As will be appreciated, $\mathcal{T}$ does not need to participate in the secret-key certificate issuing protocol due to the initial set-up in which the CA only makes I known to $\mathcal{T}$. In patent application Ser. No. 08/203,231, techniques are detailed and claimed for $\mathcal{T}$ and $\mathcal{U}$ to conduct a certificate showing protocol following the issuing protocol.

Other variations of the issuing protocol, for the case the certificate is issued to $\mathcal{U}$ and $\mathcal{T}$ in the manner described in the preceding paragraph (such as a variation in which $\mathcal{T}$ and $\mathcal{U}$ end up with a certified public key of the form $g_1^I X^v$), are believed to be obvious to construct for those of ordinary skill in the art.

2. Second Exemplary Secret-Key Certificate

As in the first preferred embodiment, a variety of other secret-key certificates will now be described, each of which is constructed from a Fiat/Shamir type signature scheme by applying the general construction technique.

A second exemplary secret-key certificate in the second preferred embodiment, constructed by applying the general construction technique to the Okamoto signature scheme (See, Okamotor, T., Section 3.2/3.3. and Section 6 in "*Provably Secure and Practical Identification Schemes and Corresponding Signature Schemes,*" Crypto '92, Lecture Notes in Computer Science 740, Springer-Verlag (1993), pp. 31–53), will now be described.

Key generation means of the KAC: The secret key of the CA is a pair $(x_1;x_2)$ in $\mathbb{Z}_v \times \mathbb{Z}_n^*$, and the corresponding public key $h_0$ is equal to $g^x x_2^v$, where g is an element of large order in $\mathbb{Z}_n^*$.

The tuple $(g,v,h_0,n)$ is made publicly known by the CA. The CA also makes publicly known a hash-function $\mathcal{H}$, which maps its arguments to, say $\mathbb{Z}_{2^t}$, for some appropriate security parameter t. This function should meet the requirements that are believed to make the Okamoto signature scheme secure.

Certificate Verification means: A secret-key certificate on a public key h in $\mathbb{Z}_n^*$ of $\mathcal{U}$ is a triple $(c,r_1,r_2)$ in $\mathbb{Z}_{2^t} \times \mathbb{Z}_v \times \mathbb{Z}_n^*$ such that c is equal to $\mathcal{H}(h, g^{r_1} f_2^{r_v}(h_0h)^{-c}, I)$.

Alternatively, the secret-key certificate can be taken to be a triple $(a,r_1,r_2)$ in $\mathbb{Z}_n^* \times \mathbb{Z}_n^* \times \mathbb{Z}_n^*$. In that case, the triple is a secret-key certificate on h if $g^{r_1} r_2^v (h_0h)^{-c}$ is equal to a, where c is computed as $\mathcal{H}(h,a,I)$.

The certificate is in effect an Okamoto signature on h made with a secret key that corresponds to the public key $h_0 h$.

Key generation means of $\mathcal{U}$: The discussion of key pairs for $\mathcal{U}$ provided earlier with respect to the first secret-key certificate for the second preferred embodiment, applies here as well. (As will be clear to those of ordinary skill in the art, the symbols $x_1, x_2$ chosen here for convenience, do not refer to the symbols in that discussion.)

Certificate issuing means: Those of ordinary skill in the art are believed to be capable of straightforwardly applying (a) the inventive technique to issue the secret-key certificate of $\mathcal{U}$ and an additional party $\mathcal{T}$, to construct similar certificate issuing protocols for the present secret-key certificate.

Remarks: As is well-known in the art, the security of the Okamoto signature scheme is at least as high as that of the Guillou/Quisquater signature scheme. (The underlying identification scheme is known to be witness hiding, whereas the Guillou/Quisquater identification scheme is not.) In general, one may let the CA use a secret key $(z_1, \ldots x_k; x_{k+1})$, and corresponding public key $h_0$ equal to $(\Pi_{i=1}^k g_i^{x_i}) x_{k+1}^v$; this, however, does not further increase the security of the signature scheme.

3. Third Exemplary Secret-Key Certificate

A third exemplary secret-key certificate in the second preferred embodiment, constructed by applying the general construction technique to the Fiat/Shamir signature scheme (See, Fiat, A. and Shamir, A., "*How to prove yourself: practical solutions to identification and signature problems,*" Proceedings of Crypto '86, Lecture Notes in Computer Science 26, Springer-Verlag (1987), pp, 186–194), will now be described.

Key generation means of the KAC: The secret key of the CA is a tuple $(x_1, \ldots x_k)$, where each $x_i$ is in $\mathbb{Z}_n^*$. The corresponding public key is $(h_1, \ldots, h_k)$, where each $h_i$ is equal to $(x_i^{-1})^2$. (Instead of squares, other powers can be used as well.)

The tuple $(h_1, \ldots h_k, n)$ is made publicly known by the CA. The CA also makes publicly known a hash-function $\mathcal{H}$, which maps its arguments to, say, $\mathbb{Z}_{2^{jkt}}$, for some appropriate security parameter l. This function should meet the requirements that are believed to make the Fiat/Shamir signature scheme secure.

Certificate verification means: A secret-key certificate on a public key $(h'_1, \ldots h'_k)$ of $\mathcal{U}$, where each $h'_i$ is in $\mathbb{Z}_n^*$, is a tuple $(c,r_1, \ldots r_1)$, where c is in $\mathbb{Z}_{2^{kt}}$ and each $r_i$ is in $\mathbb{Z}_n^*$, such that c is equal to $\mathcal{H}(h'_1, \ldots, h'_k), (r_1^2 \Pi_c \text{ } _{ij=1} h_j h'_j, \ldots r_l^2 \Pi_c \text{ } _{ij=1} h_j h'_j))$. Here, the index j runs from 1 to k, and $(c_{i1}, \ldots c_{ik})$ is the binary vector consisting of the i-th group of k bits of the number c. The notation $\Pi_c \text{ } _{ij=1} h_j h'_j$ denotes the product taken over all numbers $(h_j h'_j)$ with j such that the bit $c_{ij}$ (this is the j-th bit in the i-th group k bits of the number c) is equal to one.

One can consider the public key $(h_1, \ldots, h_k)$ of the CA to be a vector $h_0$, and the public key $(h'_1, \ldots, h'_k)$ of $\mathcal{U}$ to be a vector h. The secret-key certificate is in the effect a Fiat/Shamir signature on h made with a secret key that corresponds, under the Fiat/Shamir signature scheme, to the public key $h_0 h$, where the vector multiplication $h_0 h$ is defined by pairwise multiplication: $h_0 h$ is equal to $(h_1 h'_1, \ldots h_k h'_k)$.

Key generation means of $\mathcal{U}$: The key pair of $\mathcal{U}$ is of the same type as that of the CA. More precisely, the secret key corresponding to the public key $(h'_1, \ldots h'_k)$, denoted by h', is a vector $(x'_1, \ldots x'_k)$ such that $(x'_i)^{-2} = h'_i$.

Certificate issuing means: Those of ordinary skill in the art are believed to be capable of straightforwardly applying the inventive techniques for (a) the issuing protocols of FIGS. 8 to 12, and ()b) the inventive technique to issue the secret-key certificate to $\mathcal{U}$ and an additional party $\mathcal{T}$ to construct similar certificate issuing protocols for the present secret-key certificate.

4. Fourth Exemplary Secret-Key Certificate

Yet another Fiat/Shamir type signature scheme is the Geige/ Fiat/Shamir signature scheme (See, Feige, U., Fiat, A. and Shamir, A., *"Zero-knowledge proofs of identity,"* Journal of Cryptology 1 (1988), pp. 77–94). This scheme is a modification of the Fiat/Shamir scheme. Since the application of the general construction technique to this scheme is highly similar to the construction of the third exemplary secret-key certificate in the second preferred embodiment, a detailed description is omitted here. Again, for (a) each of the issuing protocols of FIGS. 8 to 12, and (b) the inventive technique to issue the secret-key certificate to $\mathcal{U}$ and an additional party $\mathcal{T}$, a similar issuing protocol for the present secret-key certificate can be constructed straightforwardly in this manner.

5. Fifth Exemplary Secret-Key Certificate

As in the first preferred embodiment, it will now be demonstrated that certain variations of the general construction technique can be used as well. Yet another exemplary secret-key certificate in the first preferred embodiment, constructed by applying a variation of the general construction technique to the Schnorr signature scheme, will now be described in detail.

Key generation means of the KAC: This is the same as in the description of the first secret-key certificate.

Certificate verification means: A secret-key certificate on a public key h in $\mathbb{Z}_n^*$ if $\mathcal{U}$ will now be taken to be a pair (c,r) in $\mathbb{Z}_2 \times \mathbb{Z}_n^*$ such that c is equal to $\mathcal{H}(h, r^v h^{-c}, I)$.

The secret-key certificate can alternatively be taken to be a pair (a,r) in $\mathbb{Z}_n^* \times \mathbb{Z}_n^*$ such that $r^v h^{-c}$ is equal to a, where c is computed as $\mathcal{H}(h,a,I)$.

Key generation means of $\mathcal{U}$: In general, for the modified secret-key certificate to be secure the public key of $\mathcal{U}$ must be defined as a product $g_1^{x_1} \ldots g_k^{x_{k+1}} z_1^v$. (those of ordinary skill in the art may wish to consider an even more general form, $(x_1, \ldots x_k; x_{k+1}, z_1, \ldots z_l)$, such that h is equal to $h_0^{x_{k+1}} \Pi_{i=1}^{k} g_i^{x_i} \Pi_{i=1}^{l} z_i^{v_i}$ for appropriate exponents $v_i$.) As with the first secret-key certificate. $g_1, \ldots g_k$ are randomly chosen elements of large order in $\mathbb{Z}_n^*$, that are published by the CA in addition to v, $h_0$, n, and the description of $\mathcal{H}$. At most the CA should know the v-th root of each of $g_1, \ldots g_k$.

In practice, one may want to use a simpler form of key pair. The simplest form is one in which the secret key of $\mathcal{U}$ is a number x in $\mathbb{Z}_v$, and the public key h is equal to $(h_0^z)$, and h may not be equal to 1. Another simple form is one in which the secret key of $\mathcal{U}$ is a pair $(x_1; x_2)$, such that h is equal to $h_0^{x_1} x_2^v$.

As in the first preferred embodiment, all the issuing techniques provided for the first secret-key certificate in the first preferred embodiment can be applied straightforward to construct issuing protocols for the modified secret-key certificate. It is believed that those of ordinary skill in the art are easily capable of doing so by studying the inventive techniques in conjunction with the flowcharts.

Instead, the following two remarks are made here, to help those of ordinary skill in the art appreciate the advantages of applying the general construction technique over applying the present variant thereof.

(1) Consider the restrictive blind secret-key certificate issuing protocol for the present secret-key certificate, which is similar to the flowchart of FIG. 7; if the secret key of $\mathcal{U}$ is a pair (I,x) in $\mathbb{Z}_v \times \mathbb{Z}_v$, and the public key h is equal to $h_0^I g_1^x$, then the number I/x mod v can be encoded by the CA into the secret key ($\mathcal{U}$ will not be able to modify this quotient). However, for key pairs for $\mathcal{U}$ of this form, no secure signature schemes and proofs of knowledge are known in the art. On the other hand, using a key pair of $\mathcal{U}$ such that the secret key is a pair (I;x) in $\mathbb{Z}_v \times \mathbb{Z}_n^*$, and the public key is $h_0^I x^v$, has the problem that the information that has been encoded into the secret key by the CA, cannot be efficiently reconstructed from I and x. Hence, in order for the issuing protocol to have practical value, one must take the secret key of $\mathcal{U}$ to be a triple $(I_1, I_2; x)$ such that has is equal to $h_0^{I_1} g_1^{I_2} x^v$. This is less efficient that the key pair used in the restrictive blind issuing protocol for the first secret-key certificate.

(2) As will be appreciated, the security of the systems constructed using the general construction technique is closer related to the security of the underlying Fiat/Shamir signature scheme.

Conclusion

This concludes the detailed descriptions of two preferred embodiments. While these descriptions of the present invention have been given as examples, it will be appreciated that various modifications, alternate configurations, and equivalents may be employed without departing from the spirit and scope of the present invention. For example, there are many essentially equivalent orders to evaluate expressions; ways to evaluate expressions; ways to order expressions, tests, and transmissions within flowchart boxes; ways to group operations into flowchart boxes; and ways to order flowchart boxes. The particular choices that have been made here are merely for clarity in exposition.

Certain variations and substitutions may be apparent to those of ordinary skill in the art. Although various such variations and substitutions have been indicated and sometimes described in detail in the text, this may be more fully appreciated in the light of the following examples.

First, the exemplary secret-key certificates that have been described are derived from Fiat/Shamir type signature schemes by the general following construction technique: denoting the public key of $\mathcal{U}$ by h, and that of the CA by $h_0$, a secret-certificate on h in effect is a signature of the underlying Fiat/Shamir type on the message h made with a secret key that corresponds to public key $h_0 h$. It has already been shown, at the end of the description of the first preferred embodiment, that variations on the general construction technique may be applied as well. As will be appreciated, the particular form $h_0 h$ in the general construction technique is not essential. Taking, for example, the form $h_0 h^k$ for a fixed integer k different from 1 would obviously work as well. The essence of the general construction technique is that the secret-key certificate is constructed from any Fiat/Shamir type signature scheme by letting the certificate in effect be a signature on the public key of $\mathcal{U}$, where the signature is of the underlying Fiat/Shamir type signature scheme and made with a secret key that corresponds, under the Fiat/Shamir type signature scheme, to a public key which is suitable mathematical function of the public key of $\mathcal{U}$ and the public key of the CA.

Second, hierarchic certification can be implemented with secret-key certificates. As will be clear to those of ordinary skill in the art, $\mathcal{U}$ in turn can use his certified key pair to issue a secret-key certificate to another party, and so on. In this way, a hierarchical certification tree can be constructed: each node in this tree can be consider to be a pair consisting of a public key and a secret-key certificate on the public key, where a parent node certifies the key pairs of its child nodes by issuing a secret-key certificate on the public key of each child node, computed by using a secret key corresponding to the public key of the parent node. If, for instance, a decryption can be performed by a party associated with a node in the tree, then this party must know the secret key corresponding to the public key in that node; this in turn implies that the secret-key certificate must have been computed by the party associated with the parent node, and so this party in turn knows the secret key corresponding to the public key of the parent node; hence, the secret-key certificate of the parent node must have been computed by the party associated with the parent node of the parent node; and so on, all the way to the root node.

Third, the secret-key certificate technique can be used to construct secure digital signature schemes. To sign a message, the signer party, which has a first secret key and a matching first public key, first generates independently at random a one-time secret key and a matching one-time public key, where the word "one-time" is used only to emphasize that these keys will be used only once by the signer p arty the signer party then computes a secret-key certificate on the one time public key with respect to the first public key. It can do this because it knows the first public key. It then signs the message with respect to the one-time public key, which it can do because it knows the one-time secret key. The resulting signature of the signer party on the message consists of the one-time public key, the secret-key certificate on the one-time public key, and the signature on the message with respect to the one-time public key. To verify the signature, the signature on the message is verified by using the one-time secret key and matching one-time public key each time that it has to sign a message. In effect, this method of constructing a secure digital signature scheme using the secret-key certificate issuing technique is the same as that applied in the example of hierarchic certification, disclosed in the preceding paragraph.

It will also be obvious to those of ordinary skill in the art how parts of the inventive techniques and protocols disclosed here can be used to advantage.

What is claimed is:

1. Apparatus for implementing a cryptographic system in which a first party certifies a key pair of a second party, the apparatus comprising:

first key generation means that, on being given as input at least a security parameter, outputs a pair consisting of a secret key and a matching public key, to be used by the first party;

second key generation means that, on being given as input at least a security parameter, outputs a pair consisting of a secret key and a matching public key, to be used by the second party;

certificate verification means that, on being given as input the public key of the first party and a pair consisting of a public key and a presumed certificate on the public key, responds affirmatively or negatively, depending on whether the presumed certificate on the public key is a secret-key certificate on the public key or not;

certificate issuing means that, on being given as input the secret key of the first party and a pair consisting of the secret key and the public key of the second party, outputs a digital signature on the secret key of the second party, such that the digital signature is a secret-key certificate on the public key of the second party; and certificate simulating means that, on being given as input the public key of the first party, outputs a pair consisting of a public key and a secret-key certificate on this public key, where the probability distribution of the output of the certificate simulating means is substantially indistinguishable from the probability distribution that applies when the public key is generated by the second key generation means and the secret-key certificate is generated by the certificate issuing means.

2. A cryptographic method for forming and verifying a secret-key certificate of an issuer party on a public key of a receiver party, where the certificate is called a secret key because it is a digital signature of said issuer party on a secret key corresponding to said public key but not on said public key itself, and said receiver party is able to demonstrate to a verifier party that said secret-key certificate was formed by said issuer party without necessarily revealing said secret key, the method comprising the steps of:

forming said secret-key certificate on said public key by said issuer party computing a digital signature on said secret key using a private key, said digital signature not being a digital signature of said issue party on said public key;

transforming by said receiver party to said verifier party, said public key, said secret-key certificate and data evidencing possession of said secret key by said receiver party, wherein said data does not reveal said secret key; and verifying said secret-key certificate by said verifier party, by verifying said data, and verifying whether said secret-key certificate satisfies a pre-defined certificate verification relation involving a public key of said issuer party corresponding to said private key.

3. The method of claim 2, wherein said data is a digital signature, with respect to said public key of said receiver party, on a message known to said verifier party.

4. The method of claim 2, wherein said issuer party is the same as said receiver party, and said secret key is substantially random and one-time.

5. The method of claim 2, wherein said data is a zero-knowledge proof of knowledge of said secret key by said receiver party.

6. The method of claim 2, wherein said data evidences that said receiver party successfully decrypted an encrypted message, computed by said verifier party applying said public key of said receiver party to the message.

7. The method of claim 2, wherein said data is a secret-key certificate of said receiver party, with respect to said public key of said receiver party, on a public key of said verifier party.

8. The method of claim 2, wherein during the step of forming said secret-key certificate, said receiver party hides said secret key from said issuer party.

9. The method of claim 2, wherein during the step of forming said secret-key certificate, said receiver party blinds said secret key, said public key of said receiver party, and said secret-key certificate.

10. The method of claim 2, wherein during the step of forming said secret-key certificate, said receiver party blinds said public key of said receiver party and said secret key certificate, while said issuer party prevents a part of said secret key from being blinded by said receiver party.

11. The method of claim 2, wherein said receiver party comprises two sub-parties, one of which acts on behalf of said issuer party, said secret key being shared by said two sub-parties to the effect that neither sub-party knows said secret key.

12. The method of claim 2, wherein said secret-key certificate is a digital signature of the Fiat/Shamir type formed by applying a mathematical combination of said secret key and said private key to at least said public key of said receiver party.

13. The method of claim 2, wherein said pre-defined certificate verification relation also involves a string identifying said receiver party.

14. A cryptographic apparatus for forming and verifying a secret-key certificate of an issuer party on a public key of a receiver party, where the certificate is called a secret-key certificate because it is a digital signature of said issuer party on a secret key corresponding to said public key but not on said public key itself, and said receiver party is able to demonstrate to a verifier party that said secret-key certificate was formed by said issuer party without necessarily revealing said secret key, the apparatus comprising;

certificate forming means for forming said secret-key certificate on said public key by said issuer party computing said digital signature on said secret key using a private key, said digital signature not being a digital signature of said issuer party on said public key;

certificate storing means, for storing by said receiver party, said secret key, said public key and said secret-key certificate;

data computing means for computing by said receiver party, data evidencing possession of said secret key by said receiver party, wherein said data does not reveal said secret key;

certificate transferring means for transferring to said verifier party, said public key, said secret-key certificate and said data; and certificate verification means for verifying said secret-key certificate by said verifier party, wherein said means verifies whether said secret-key certificate satisfies a pre-defined certificate verification relation involving a public key of said issuer party corresponding to said private key, and by verifying said data.

15. The apparatus of claim 14, wherein said data is a digital signature, with respect to said public key of said receiver party, on a message known to said verifier party.

16. The apparatus of claim 14, wherein said data is a zero-knowledge proof of knowledge of said secret key by said receiver party.

17. The apparatus of claim 14, wherein said data evidences that said receiver party successfully decrypted an encrypted message, computed by said verifier party applying said public key of said receiver party to the message.

18. The apparatus of claim 14, wherein said certificate forming means further comprises hiding means for said receiver party to hide said secret key from said issuer party.

19. The apparatus of claim 14, wherein said certificate forming means further comprises blinding means for said receiver party to blind said public key of said receiver party and said secret-key certificate, and blinding-preventing means for said issuer party to prevent a part of said secret key from being blinded by said receiver party.

20. The apparatus of claim 19, wherein said certificate storing means further comprises tamper-resistant storing means for storing part of said secret key, said tamper-resistant storing means acting on behalf of said issuer party.

21. The apparatus of claim 14, wherein said secret-key certificate is a digital signature of the Fiat/Shamir type formed by applying a arithmetical combination of said secret key and said private key to at least said public key of said receiver party.

* * * * *

UNITED STATES PATENT AND TRADEMARK OFFICE
CERTIFICATE OF CORRECTION

PATENT NO. : 5,606,617
DATED : February 25, 1997
INVENTOR(S) : Stefanus A. Brands It is certified that error appears in the above-indentified patent and that said Letters Patent is hereby corrected as shown below:

The Title page, showing an illustrative figure, should be deleted and substitute therefor the attached Title page.

Column 38, claim 2, line 3, change "is called a secret key" to --is called a secret-key certificate--.

Column 40, claim 21, line 3, before "arithmetical" change "a" to --an--.

Signed and Sealed this

Ninth Day of September, 1997

BRUCE LEHMAN

*Attest:*

*Attesting Officer*            Commissioner of Patents and Trademarks

United States Patent [19]

Brands

[11] Patent Number: 5,606,617
[45] Date of Patent: Feb. 25, 1997

[54] SECRET-KEY CERTIFICATES

[76] Inventor: Stefanus A. Brands, Ina Boudier-Bakkerlaan 143 (iii), XW Utrecht, Netherlands, 3582

[21] Appl. No.: 321,855

[22] Filed: Oct. 14, 1994

[51] Int. Cl.$^6$ .................................. H04L 9/30
[52] U.S. Cl. ........................................ 380/30
[58] Field of Search .............................. 380/30

[56] References Cited

U.S. PATENT DOCUMENTS

| | | | |
|---|---|---|---|
| 4,759,063 | 7/1988 | Chaum | 380/30 |
| 4,868,877 | 9/1989 | Fischer | 380/30 |
| 4,947,430 | 8/1990 | Chaum | 380/30 |
| 5,005,200 | 4/1991 | Fischer | 380/30 |
| 5,373,561 | 12/1994 | Haber et al. | 380/30 |
| 5,475,753 | 12/1995 | Barbará et al. | 380/30 |

OTHER PUBLICATIONS

Fiat, A. and Shamir, A., "How to prove yourself: practical solutions to identification and signature problems," Crypto '86, Springer-Verlag (1987), pp. 186–194.

Schnorr, C., "Efficient Signature Generation by Smart Cards," Journal of Cryptology, vol. 4, No. 3 (1991), pp. 161–174.

ElGamal, T., "A public key cryptosystem and a signature scheme based on discrete logarithms," IEEE Transactions on Information Theory, vol. IT-31, No. 4, Jul. 1985, pp. 469–472.

Okamoto, T., "Provably Secure and Practical Identification Schemes and Corresponding Signature Schemes," Crypto '92, Lecture Notes in Computer Science 740, Springer-Verlag (1993), pp. 31–53.

Brickell, E. and McCurley, K., "An interactive identification scheme based on discrete logarithms and factoring," Journal of Cryptology, vol. 5, No. 1 (1992), pp. 29–39.

NIST, "Specifications for a digital signature standard (DSS)," Federal Information Processing Standards Pub. (draft), May 19, 1994.

R. Rivest, A. Shamir and L. Adleman, "A method for obtaining digital signatures and public-key cryptosystems," Communications of the ACM, Feb. 1978, pp. 120–126.

Guillou, L. and Quisquater, J., "A practical zero-knowledge protocol fitted to security microprocessor minimizing both transmission and memory," Lecture Notes in Computer Science 330, Proceedings of Eurocrypt '88, Springer-Verlag (1989), pp. 123–128.

Feige, U., Fiat, A. and Shamir, A., "Zero-knowledge proofs of identity," Journal of Cryptology 1 (1988), pp. 77–94.

*Primary Examiner*—Salvatore Cangialosi
*Attorney, Agent, or Firm*—Pennie & Edmonds

[57] ABSTRACT

Cryptographic methods and apparatus are disclosed that enable forming and issuing of secret-key certificates. Contrary to the well-known cryptographic technique of public-key certificates, where a public-key certificate is a digital signature of a certification authority on a public key, pairs consisting of a public key and a corresponding secret-key certificate can be generated by anyone. As a result, a public-key directory based on secret-key certificates cannot help anyone in attacking the signature scheme of the certification authority, and it does not reveal which of the listed public keys have been certified by the certification authority and which have not.

Yet, if a party associated with a public key can perform cryptographic actions with the secret key corresponding to its public key, such as decrypting, digital signing, issuing a secret-key certificate, and identification, then the certificate must have been computed by the certification authority.

21 Claims, 12 Drawing Sheets

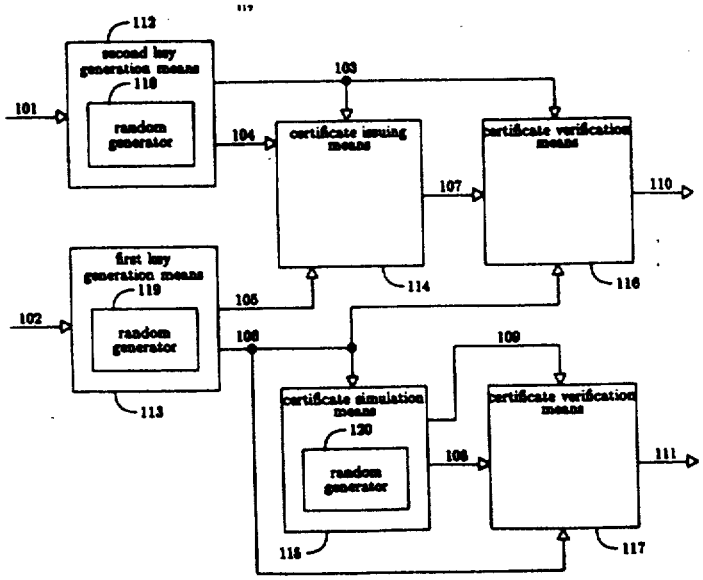

UNITED STATES PATENT AND TRADEMARK OFFICE
CERTIFICATE OF CORRECTION

PATENT NO. : 5,606,617
DATED : February 25, 1997
INVENTOR(S) : Stefanus A. Brands It is certified that error appears in the above-identified patent and that said Letters Patent is hereby corrected as shown below:

Column 1, line 47, change "be" to --by--.

Column 2, line 26, change "new" to --near--;
         line 46, change "amount" to --number--.
         line 55, change "amount" to --number--.

Column 3, line 5, change "the" (third occurrence) to --in--;
         line 13, change "can" (first occurrence) to --cash--;
         line 21, change "by" to --but--; and Column 4, line 14, change "Springer-Verlay" to --Springer-Verlag--.

Column 5, line 6, change "known" to --know--.

Column 6, line 17, change "attaching" to --attacking--.

Column 7, line 6, change "part" to --party--;
         line 20, change "$\mathbb{Z}$" to --$\mathbb{Z}_l$--;
         line 24, change "$\mathbb{Z}_2^t$" to --$\mathbb{Z}_{2'}$--;

line 27, change "$g_o^x$," to --$g^{x_o}$--;
         line 31, change "a" (first occurrence) to "A";
         line 32, change "$\mathbb{Z}_{2t}$" to --$\mathbb{Z}_{2'}$--;

line 51, change "$(X_o+x)+w$" to --$(x_o+x)+w$--; and
         line 54, change "known" to --know--; after "key" insert --of--.

UNITED STATES PATENT AND TRADEMARK OFFICE
CERTIFICATE OF CORRECTION

PATENT NO. : 5,606,617
DATED : February 25, 1997
INVENTOR(S) : Stefanus A. Brands It is certified that error appears in the above-identified patent and that said Letters Patent is hereby corrected as shown below:

Column 8, line 1, change "certificates" to --certificate--.
line 10, change "known" to --know--;
line 31, change "$\mathbb{Z}_l$" to --$\mathbb{Z}_l^*$--;
line 33, change "$\mathbb{Z}_l$" to --$\mathbb{Z}_l^*$--;
line 34, change "$\mathbb{Z}_l$" to --$\mathbb{Z}_l^*$--;
line 45, change "$=$" to --$\stackrel{?}{=}$--;
line 64, change "Certificates" to --Certificate--; and
lines 66-67, Do not indent text in paragraph.

Column 9, line 7, change "polynominally" to --polynomially--;
line 14, after "generator" insert --by--.

Column 10, line 60, change "keys" to --key--.

Column 11, line 12, change "not" to --now--;
line 20, change "be" (first occurrence) to --for--;
line 38, change "zoo" to --103--; and
line 52, change "of" to --on--.

Column 12, line 13, after "key" insert --on--;
line 36, change "responses" to --response--;
line 43, delete "at";
lines 51-60, Do not indent text in paragraph; and
line 61, change "consist" to --consists--.

UNITED STATES PATENT AND TRADEMARK OFFICE
CERTIFICATE OF CORRECTION

PATENT NO. : 5,606,617
DATED : February 25, 1997
INVENTOR(S) : Stefanus A. Brands It is certified that error appears in the above-identified patent and that said Letters Patent is hereby corrected as shown below:

Column 13, line 9, after "embodiment" insert --,--;
lines 10-21, Do not indent text in paragraph;
line 12, after "elements" insert --,--;
line 31, Do not indent paragraph;
line 39, change "$g_o^x$" to --$g^{x_o}$--;
line 44, change "$Z_2^t$" to --$Z_{2^t}$--;
line 46, change "$Z_2^t$" to --$Z_{2^t}$--;
line 55, change "$Z_2^t$" to --$Z_{2^t}$--; and
line 58, after "mail" insert --address--.

Column 14, line 12, change "$\Pi$" to --$\prod_{i=1}^{k} g_i^{x_i}$--;
line 19, change "set" to --sets--, and change "$G_i^y$" to --$g^{y_i}$--; and
line 39, change "$g_1^{x_1} g_2^{x_2}$" to --$g_1^{x_1} g_2^{x_2}$--.

Column 15, lines 8-19, Do not indent text in paragraph;
line 62, change "$(c_2 r_2)$" to --$(c_2, r_2)$--;
line 63, change "$g_2^{r_2}$" to --$g^{r_2}$--, and change "-2" to "-$C_2$; and
line 65, change ")" to --(--, and before "can" insert --. $If\ U_2$--.

UNITED STATES PATENT AND TRADEMARK OFFICE
CERTIFICATE OF CORRECTION

PATENT NO. : 5,606,617
DATED : February 25, 1997
INVENTOR(S) : Stefanus A. Brands It is certified that error appears in the above-identified patent and that said Letters Patent is hereby corrected as shown below:

Column 16, line 7, change "keys" to --key--;
line 8, change "have" to --has--;
line 14, after "$U_2$" add --a--;
line 17, change "$(h_2, g_2'(h_0$" to --$(h_2, g'^2(h_0$--;
line 18, change "$h_2)^{-2}$" to --$h_2)^{-c_2}$--;
line 41, change "{0.1}" to --{0,1}--;
line 42, change "$clog_g$" to --$c\ log_g$--;
lines 57-67, Do not indent paragraph; and
line 66, change "$Z_2^t$" to --$Z_{2^t}$--.

Column 17, line 3, change "not" to --now--;
line 12, change "x" to --w--;
lines 16-17, change "U" to --U.--; before "computing" insert --Box 23 first shows U--;
lines 27-37, Do not indent text in paragraph; and
line 53, change "$g'_o$" to --$g'^o$--.

Column 18, lines 3-10, Do not indent text in paragraph;
line 11, after "key", insert --certificate--;
line 16, change "$g^w{}_o$" to --$g^{w_o}$--;
line 31, change "$^{31c}$" to --$^c$--
line 48, change "xx" to --cx--; and
lines 58-61, Do not indent text in paragraph.

UNITED STATES PATENT AND TRADEMARK OFFICE
CERTIFICATE OF CORRECTION

PATENT NO. : 5,606,617
DATED : February 25, 1997
INVENTOR(S) : Stefanus A. Brands It is certified that error appears in the above-identified patent and that said Letters Patent is hereby corrected as shown below:

Column 19, line 6, change "has" to --hash--;
         line 7, change "the the" to --the type--;
         line 34, after "key" insert --certificate--, and change "second" to --first--; and
         line 53, change "thid" to --third--.

Column 20, line 5, after "key" insert --certificate--;
         line 31, change "corresponding" to --correspond--;
         lines 37-50, Do not indent text in paragraph; and
         line 39, change "U ." to --U.--.

Column 21, line 15, change "identify" to --identity--;
         line 37, change "to" to --with--;
         line 62, change "identify" to --identity; and
         line 67, change "$a_o$to" to --$a_o$ to--.

Column 22, line 25, change "than" to --then--; and
         lines 32-56, Do not indent text in paragraph.

Column 23, lines 3-5, Do not indent text in paragraph;
         line 12, change "not" to --now--;
         line 26, change "pp 31-35)" to --pp. 31-35)--;
         line 32, after "uniformly", change "t" to --at--; and
         line 43, change "$\mathbb{Z}^q$" to "$\mathbb{Z}_q$", and this term should appear on line 42 before the word "such".

UNITED STATES PATENT AND TRADEMARK OFFICE
CERTIFICATE OF CORRECTION

PATENT NO. : 5,606,617
DATED : February 25, 1997
INVENTOR(S) : Stefanus A. Brands It is certified that error appears in the above-identified patent and that said Letters Patent is hereby corrected as shown below:

Column 24, line 2, change "$\Pi$" to --$\prod_{i=1}^{k} g_i^{x_i}$--;
line 8, change "embodiment ," to --embodiment,--
lines 8-13, Do not indent text in paragraph;
line 19, change "of" to --modulo--;
line 21, after "where" delete ",";
line 23, delete "a";
line 49, change "p-1" to --p-1--;
line 50, change "$g^{wmodq}$" to --$g^{w \bmod q}$--; and
lines 59-63, Do not indent text in paragraph.

Column 25, line 9, change "((G$^{cr}$" to --((g$^{cr}$--;
line 10, change "(h,I)" to --(h,a,I)--;
lines 27-31, Do not indent text in paragraph;
line 51, after "elements" delete ","; and
line 58, delete ")".

Column 26, line 2, change "blinded" to --blind--;
line 3, change "not" to --now--;
line 5, change "$g_z$" to --$g_1$--;
line 20, change "$Z^{hd\,q}$" to --$\mathbb{Z}_q$--;
line 25, change "r and c the" to --r and c. The--;
line 34, change "$g^{r_0}(h_0 g_1^{I-c_0}$" to --$g^{r_0}(h_0 g_1^I)^{-c_0}$--;
lines 53-61, Do not indent text in paragraph;

line 61, change "1" to --$I\!N$--; and
line 63, change "module" to --modulo--.

Column 27, lines 31-38, Do not indent text in paragraph; and
line 46, change "ar" to --at--.

UNITED STATES PATENT AND TRADEMARK OFFICE
CERTIFICATE OF CORRECTION

PATENT NO. : 5,606,617
DATED : February 25, 1997
INVENTOR(S) : Stefanus A. Brands It is certified that error appears in the above-identified patent and that said Letters Patent is hereby corrected as shown below:

Column 28, line 3, change "$\prod_{i=1}^{k} g_i^{z_i}$" to --$\prod_{i=1}^{k} g_i^{z_i}$--;

line 6, change "$\prod_{i=1}^{k} g_i^{z_i}$" to --$\prod_{i=1}^{k} g_i^{z_i}$--, and change "$\prod_{i=1}^{l} x_i^{v_i}$" to --$\prod_{i=1}^{l} x_i^{v_i}$--;

lines 21-22, change "$\prod_{i=1}^{k}$" to --$\prod_{i=1}^{k}$--;
lines 51-54, Do not indent paragraph;
line 65, after "$c_2$" insert --,--; and
line 66, change "$r x^v$" to --$r_2 x^v$-- and change "-2" to -- $-c_2$ --.

Column 29, line 1, after "g*" insert --,--;
line 16, change "$-_c2$" to -- $-c_2$ --; and
lines 24-31, Do not indent paragraph.

Column 30, line 1, before "issuing", insert --certificate--
line 20, in the equation, change "$f_o$" to -- $r_o$ --;
lines 30-38, Do not indent paragraph; and
line 64, after "factors" insert --.--, and change "to" to --To--.

Column 31, lines 3-5, Do not indent paragraph;
line 7, after "secret-key" insert --certificate--;
lines 45-49, Do not indent paragraph; and
line 53, change "on" to --in--.

Column 32, line 6, change "$r_{09}$" to --$r_0$--;
lines 13-21, Do not indent paragraph;
line 39, change "as" to --a--; and
line 58, change "$-c^o$" to -- $-c_o$ --.

line 58, change "$r_0^v(h_0 g_1)-c^0$" to --"$r_0^v(h_0 g_1)^{-c_0}$"--;

UNITED STATES PATENT AND TRADEMARK OFFICE
CERTIFICATE OF CORRECTION

PATENT NO. : 5,606,617
DATED : February 25, 1997
INVENTOR(S) : Stefanus A. Brands It is certified that error appears in the above-identified patent and that said Letters Patent is hereby corrected as shown below:

Column 33, line 1, change "than" to --then--;
        lines 8-14, Do not indent paragraph;
        line 16, change "not" to --now--, and delete "used";
        line 35, change "$g_1^I X^v$" to --$g_1^I x^v$--;
        lines 40-42, Do not indent paragraph;
        line 46, change "Okamotor" to --Okamoto--;
        line 57, change "$\mathbb{Z}_2\iota$" to --$\mathbb{Z}_{2^l}$--; and line 63, change "$\mathbb{Z}^{n*}$" to --$\mathbb{Z}_n^*$--, and change "$f_2$" to --$r_2$--.

Column 34, lines 11-12, change "(a)" to --(b)--, and after "applying" insert the following text: --(a) the inventive techniques for the issuing protocols of FIGS. 8 to 12, and--;
        line 21, change "$z_1$" to --$x_1$--;
        lines 28-34, Do not indent paragraph;
        line 33, after "pp" insert --.--;
        line 42, change "$\mathbb{Z}_{2^u}$" to --$\mathbb{Z}_{2^u}$--;

line 49, change "$\prod c^{1 i=1} h_i h'j$" to --$\prod_{c_i,j=1} h_j h_j'$--;

line 50, change "$\prod c^{ij=1}$" to --$\prod_{c_{ij}=1}$--;

line 52, change "$\prod c^{ij=1} h_i h_i$" to --$\prod_{c_{ij}=1} h_j h_j'$--; and line 58, after "in" delete "the".

UNITED STATES PATENT AND TRADEMARK OFFICE
CERTIFICATE OF CORRECTION

PATENT NO. : 5,606,617
DATED : February 25, 1997
INVENTOR(S) : Stefanus A. Brands It is certified that error appears in the above-identified patent and that said Letters Patent is hereby corrected as shown below:

Column 35, line 4, change "()b)" to --(b)--;
    line 10, change "Geige/" to --Feige/--;
    lines 11-23, Do not indent paragraph;
    lines 27-32, Do not indent paragraph;
    line 31, change "Schnorr" to --Guillou-Quisgnater--;
    line 36, change "if" to --of--;
    line 43, change "$g_k{}^{x_{k+1}}$" to --$g_k^{x_k} h_0^{x_{k+1}} z_l^v$--, and change "those" to --Those--;

line 46, change "$\prod_{i=1}^{k} g_i^{x_i}$" to --$\prod_{l=1}^{k} g_i^{x_i}$--, and change "$\prod_{i=1}^{l} z_i^{v_i}$" to --$\prod_{l=1}^{l} z_i^{v_i}$--;

line 47, after "certificate" insert --,--; and
    line 59, change "straightforward" to --straightforwardly--.

Column 36, line 14, change "has" to -- h --;
    line 15, change "that" to --than--;
    lines 26-34, Do not indent paragraph; and
    line 42, transpose "general following" to --following general--.

Column 37, line 22, change "p arty the" to --party. The--;
    line 23, change "one time" to --one-time--; and
    line 24, change "public" (second occurrence) to --secret--.

UNITED STATES PATENT AND TRADEMARK OFFICE
CERTIFICATE OF CORRECTION

PATENT NO. : 5,606,617
DATED : February 25, 1997
INVENTOR(S) : Stefanus A. Brands It is certified that error appears in the above-identified patent and that said Letters Patent is hereby corrected as shown below:

Column 38, Claim 2, line 11, change "a" to --said--; and
line 15, change "transforming" to --transferring--.

Column 39, Claim 12, line 3, change "a mathematical" to --an arithmetical--.

Column 40, Claim 14, last line, change "by verifying" to --verifies--; and

Signed and Sealed this

Twenty-sixth Day of May, 1998

Attest:

BRUCE LEHMAN

*Attesting Officer*   *Commissioner of Patents and Trademarks*